(12) United States Patent
Romera et al.

(10) Patent No.: US 10,159,053 B2
(45) Date of Patent: Dec. 18, 2018

(54) LOW-LATENCY LOW-UNCERTAINTY TIMER SYNCHRONIZATION MECHANISM ACROSS MULTIPLE DEVICES

(71) Applicant: QUALCOMM Incorporated, San Diego, CA (US)

(72) Inventors: Joaquin Romera, San Diego, CA (US); Graig Zethner, San Diego, CA (US); Raheel Khan, Tustin, CA (US)

(73) Assignee: QUALCOMM Incorporated, San Diego, CA (US)

( * ) Notice: Subject to any disclaimer, the term of this patent is extended or adjusted under 35 U.S.C. 154(b) by 128 days.

(21) Appl. No.: 15/251,581

(22) Filed: Aug. 30, 2016

(65) Prior Publication Data
US 2017/0223646 A1 Aug. 3, 2017

Related U.S. Application Data

(60) Provisional application No. 62/290,309, filed on Feb. 2, 2016, provisional application No. 62/358,429, filed on Jul. 5, 2016.

(51) Int. Cl.
*H04W 56/00* (2009.01)
*H04L 7/02* (2006.01)
(Continued)

(52) U.S. Cl.
CPC ...... *H04W 56/001* (2013.01); *G06F 13/4273* (2013.01); *H04L 7/02* (2013.01);
(Continued)

(58) Field of Classification Search
None
See application file for complete search history.

(56) References Cited

U.S. PATENT DOCUMENTS

| 5,237,322 A | 8/1993 | Heberle |
| 5,602,843 A | 2/1997 | Gray |

(Continued)

FOREIGN PATENT DOCUMENTS

WO  WO-2015191875 A1  12/2015

OTHER PUBLICATIONS

Cypress, "Programmable Radio-on-Chip with Bluetooth Low Energy (PRoC BLE)," CYBL10X6X Family Datasheet, Document No. 001-90478, Aug. 19, 2015, pp. 1-42.
(Continued)

*Primary Examiner* — Diane L Lo
(74) *Attorney, Agent, or Firm* — Loza & Loza, LLP/Qualcomm

(57) ABSTRACT

Systems, methods, and apparatus for synchronizing timing in devices coupled to a data communication link are disclosed. In one example, a first device programs a future system time value in a second device. The first device launches a low-latency trigger signal that causes the future system time value to be loaded into a timer of the second device when a timer of the first device matches the future system time value. The second device measures phase difference between the trigger signal and edges of a clock signal used for timing in the second device. The phase difference is measured using an oversampling clock that provides a desired measurement reliability. The measured phase difference permits the first device to accurately determine system time as applied to the second device. The trigger signal can be provided on existing pins used by first and second devices in accordance with communication protocols and specifications.

30 Claims, 14 Drawing Sheets

(51) Int. Cl.
*H04W 52/02* (2009.01)
*G06F 13/42* (2006.01)

(52) U.S. Cl.
CPC ....... *H04W 52/0235* (2013.01); *Y02D 70/122* (2018.01); *Y02D 70/164* (2018.01); *Y02D 70/26* (2018.01)

(56) References Cited

U.S. PATENT DOCUMENTS

| | | | |
|---|---|---|---|
| 6,535,926 B1 | 3/2003 | Esker | |
| 6,772,251 B1 | 8/2004 | Hastings et al. | |
| 6,977,960 B2 | 12/2005 | Takinosawa | |
| 7,111,208 B2 | 9/2006 | Hoang et al. | |
| 7,142,557 B2 | 11/2006 | Dhir et al. | |
| 7,275,195 B2 | 9/2007 | Martinez | |
| 7,343,535 B2 | 3/2008 | Lai et al. | |
| 7,363,563 B1 | 4/2008 | Hissen et al. | |
| 7,953,162 B2 | 5/2011 | Shetty | |
| 8,144,810 B2 | 3/2012 | Gronemeyer et al. | |
| 8,175,173 B2 | 5/2012 | Shetty | |
| 8,203,976 B2 | 6/2012 | Komoda | |
| 8,307,235 B2 | 11/2012 | Patel et al. | |
| 8,325,767 B2 | 12/2012 | Burch et al. | |
| 8,719,613 B2 | 5/2014 | Neben | |
| 8,724,758 B2 | 5/2014 | Meltser et al. | |
| 8,737,456 B2 | 5/2014 | Hollis | |
| 8,737,552 B1 | 5/2014 | Sawyer | |
| 8,787,471 B1 | 7/2014 | Lifshitz | |
| 8,908,779 B2 | 12/2014 | Douglass | |
| 9,026,069 B2 | 5/2015 | Bellaouar et al. | |
| 9,047,934 B1 | 6/2015 | Ng et al. | |
| 9,065,580 B2 | 6/2015 | Silverman et al. | |
| 9,077,527 B2 | 7/2015 | Wu et al. | |
| 9,141,577 B2 | 9/2015 | Wagh et al. | |
| 9,225,507 B1* | 12/2015 | Lye .................. H04L 7/0331 | |
| 9,239,810 B2 | 1/2016 | Chen et al. | |
| 9,280,510 B2 | 3/2016 | Ranganathan et al. | |
| 9,432,298 B1 | 8/2016 | Smith | |
| 9,490,791 B2 | 11/2016 | Liu et al. | |
| 9,582,454 B2 | 2/2017 | Hsueh et al. | |
| 9,647,852 B2 | 5/2017 | Berke et al. | |
| 9,678,552 B2 | 6/2017 | Ahmed et al. | |
| 9,785,604 B2 | 10/2017 | Mejia et al. | |
| 2004/0001050 A1 | 1/2004 | Fievre | |
| 2004/0100909 A1 | 5/2004 | Lee et al. | |
| 2004/0267947 A1 | 12/2004 | Sheahan et al. | |
| 2005/0010685 A1 | 1/2005 | Ramnath et al. | |
| 2005/0032533 A1 | 2/2005 | Pilgram et al. | |
| 2005/0068987 A1 | 3/2005 | Schaik et al. | |
| 2007/0176919 A1 | 8/2007 | Yamashita et al. | |
| 2008/0212551 A1 | 9/2008 | Wu et al. | |
| 2009/0257445 A1 | 10/2009 | Chan et al. | |
| 2009/0274207 A1 | 11/2009 | O'Keeffe et al. | |
| 2010/0052743 A1* | 3/2010 | Kamizuma ......... G06F 13/4243 327/144 |
| 2010/0074383 A1 | 3/2010 | Lee et al. | |
| 2011/0014918 A1 | 1/2011 | Padfield et al. | |
| 2011/0206143 A1 | 8/2011 | Reinhardt et al. | |
| 2011/0299537 A1 | 12/2011 | Saraiya et al. | |
| 2011/0310978 A1 | 12/2011 | Wu et al. | |
| 2012/0224491 A1 | 9/2012 | Norair | |
| 2014/0010317 A1 | 1/2014 | Oshikiri et al. | |
| 2014/0334582 A1 | 11/2014 | Bock et al. | |
| 2015/0043398 A1 | 2/2015 | Fwu et al. | |
| 2015/0074306 A1 | 3/2015 | Ayyagari et al. | |
| 2015/0078501 A1 | 3/2015 | Olejarz et al. | |
| 2015/0100713 A1 | 4/2015 | Sengoku | |
| 2015/0121149 A1 | 4/2015 | Cooke et al. | |
| 2015/0180803 A1 | 6/2015 | Li et al. | |
| 2015/0199290 A1 | 7/2015 | Mathewson et al. | |
| 2015/0326504 A1 | 11/2015 | Yu et al. | |
| 2016/0029385 A1 | 1/2016 | Shapira et al. | |
| 2016/0055114 A1 | 2/2016 | Freiwald et al. | |
| 2017/0041086 A1 | 2/2017 | Park et al. | |
| 2017/0060808 A1 | 3/2017 | Randell et al. | |
| 2017/0220517 A1 | 8/2017 | Khan et al. | |
| 2017/0222684 A1 | 8/2017 | Khan et al. | |
| 2017/0222685 A1 | 8/2017 | Khan et al. | |
| 2017/0222686 A1 | 8/2017 | Khan et al. | |

OTHER PUBLICATIONS

<span style="font-family: calibri;">Eftimakis M., et al., "High-Speed Serial Fully Digital Interface between WLAN RF and BB Chips", Retrieved from Internet on Nov. 15, 2016, https://www.design.reuse.com/articles/9472/high-speed-serial-fully-digi . . . , pp. 1-37.
Xilinx, "Zynq-7000 All Programmable SoC Overview," DS190 (V1.10), Sep. 27, 2016, pp. 1-25.
Fogg A., "DigRF Baseband/RF Digital Interface Speci Fication", Internet Citation, Feb. 20, 2004 (Feb. 20, 2004), XP002325710, Retrieved from the Internet: URL: http://146.101.169.51/DigRF%20Standard%20v112.pdf [retrieved on Feb. 20, 2004].
International Search Report and Written Opinion—PCT/US2016/068441—ISA/EPO—dated Apr. 12, 2017.
Dickson T.O., et al., "A 1.4 pJ/bit, Power-Scalable 16×12 Gb/s Source-Synchronous I/O With DFE Receiver in 32 nm SOI CMOS Technology", IEEE Journal of Solid-State Circuits, IEEE Service Center, Piscataway, NJ, USA, vol. 50, No. 8, Aug. 1, 2015, pp. 1917-1931, XP011664156, ISSN: 0018-9200, DOI: 10.1109/JSSC.2015.2412688 [retrieved on Jul. 24, 2015].

* cited by examiner

LOW-LATENCY LOW-UNCERTAINTY TIMER SYNCHRONIZATION MECHANISM ACROSS MULTIPLE DEVICES

CROSS-REFERENCE TO RELATED APPLICATIONS

This application claims the benefit of U.S. Provisional Application Ser. No. 62/290,309 filed in the U.S. Patent Office on Feb. 2, 2016, and from U.S. Provisional Application Ser. No. 62/358,429 filed in the U.S. Patent Office on Jul. 5, 2016, the entire content of these applications being incorporated herein by reference and for all applicable purposes.

TECHNICAL FIELD

The present disclosure relates generally to communications links connecting integrated circuit devices within an apparatus, and more particularly, to synchronization of timers in integrated circuit devices within an apparatus.

BACKGROUND

A mobile communications apparatus may include integrated circuit (IC) devices that use high-speed digital interconnects to communicate between or within certain IC devices. For example, a cellular telephone may include high-speed digital interconnects to support communication between radio frequency (RF) and baseband modem chipsets. High-speed digital interconnects may be used to transport data, control information or both data and control information between different functional components of an apparatus. Serial interfaces have become the preferred method for digital communication between IC devices in various apparatus. For example, a communications apparatus may use a high speed digital interconnect between RF and baseband modem chipsets. Mobile communications devices may perform certain functions and provide capabilities using IC devices that include RF transceivers, cameras, display systems, user interfaces, controllers, storage, and the like. General-purpose serial interfaces known in the industry, including the Inter-Integrated Circuit (I2C or I²C) serial bus and its derivatives and alternatives, including interfaces defined by the Mobile Industry Processor Interface (MIPI) Alliance, such as the I3C interface and the radio frequency front-end (RFFE) interface. Some standardized interfaces and proprietary interfaces may be applicable for use in coupling certain components of mobile communications equipment and may be optimized to meet certain requirements of the mobile communications equipment.

In one example, the I2C serial bus is a serial single-ended computer bus that was intended for use in connecting low-speed peripherals to a processor. Some interfaces provide multi-master busses in which two or more devices can serve as a bus master for different messages transmitted on the serial bus. In another example, the RFFE interface defines a communication interface for controlling various radio frequency front-end devices, including power amplifier (PA), low-noise amplifiers (LNAs), antenna tuners, filters, sensors, power management devices, switches, etc. These devices may be collocated in a single integrated circuit (IC) or provided in multiple IC devices. In a mobile communications device, multiple antennas and radio transceivers may support multiple concurrent RF links. Certain functions can be shared among the front-end devices and the RFFE interface enables concurrent and/or parallel operation of transceivers using multi-master, multi-slave configurations.

As the demand for improved communications between devices continues to increase, there exists a need for improvements in protocols and methods for managing the interfaces between RF front-end devices. For example, device synchronization can be problematic when, for example, RF devices are required to meet strict timing specifications in a multiple access RF network. Implementing global synchronization can be difficult and costly. Synchronization implemented using existing bus protocols to transfer system timer information may result in high-latency and high degrees of uncertainty.

SUMMARY

Certain aspects of the disclosure relate to systems, apparatus, methods and techniques for implementing and managing digital communication interfaces that may be used between IC devices in various apparatus. In some aspects, the digital communication interfaces provide methods, protocols and techniques that may be used to synchronize timing in devices within an apparatus such as a communications device.

In various aspects of the disclosure, a method for synchronizing timing in devices coupled to a data communication link may include receiving a first time value from a second device through the data communication link, the first time value corresponding to a future point in time, receiving a trigger signal from the second device through the data communication link, loading the first time value into the timer at a first-occurring edge in a first clock signal after the trigger signal is received, where the first clock signal is used to increment the timer, and identifying to the second device a phase of the first clock signal at the time the trigger signal is received. The phase of the first clock signal at the time the trigger signal is received may indicate a phase difference between first clock signal and a second clock signal that is used by the second device. The first time value is loaded into the timer in a cycle of the first clock signal that terminates at the first-occurring edge in the first clock signal.

In one aspect, the method includes sampling the trigger signal using a third clock signal that has a frequency that is more than twice the frequency of the first clock signal. The method may include counting periods of a third clock signal for the duration of each cycle of the first clock, and identifying the phase of the first clock signal at the time the trigger signal is received by providing the second device with a number representing the periods of the third clock signal counted from beginning of a clock cycle of the first clock signal until the trigger signal is received. The trigger signal may be received before arrival of the future point in time. In one example, the third clock signal has a frequency that is 8 or 10 times the frequency of the first clock signal.

In one aspect, the method includes entering a low-power mode of operation after receiving the first time value, and receiving the trigger signal while exiting the low-power mode of operation. The data communication link may be inactive during the low-power mode of operation.

In some aspects, the second clock signal may be used by the second device to increment a system timer (STMR) on the second device, and where the system timer defines system time for the devices coupled to the data communication link. The second clock signal may be used by the second device to define system time, and where the second clock signal is half the frequency of the first clock signal.

The phase of the first clock signal at the time the trigger signal is received indicates a difference between system time and a local time maintained by the first timer.

In one aspect, the trigger signal is received using a metastability-hardened flip-flop to receive the trigger signal from the data communication link.

In various aspects of the disclosure, an apparatus may be adapted to synchronize timing in devices coupled to a data communication link by receiving a first time value from a second device through the data communication link, the first time value corresponding to a future point in time, receiving a trigger signal from the second device through the data communication link, loading the first time value into the timer at a first-occurring edge in a first clock signal after the trigger signal is received, where the first clock signal is used to increment the timer, and identifying to the second device a phase of the first clock signal at the time the trigger signal is received. The phase of the first clock signal at the time the trigger signal is received may indicate a phase difference between first clock signal and a second clock signal that is used by the second device. The first time value is loaded into the timer in a cycle of the first clock signal that terminates at the first-occurring edge in the first clock signal.

In various aspects of the disclosure, an apparatus may have means for receiving a first time value from a second device through the data communication link, the first time value corresponding to a future point in time, means for receiving a trigger signal from the second device through the data communication link, means for loading the first time value into the timer at a first-occurring edge in a first clock signal after the trigger signal is received, where the first clock signal is used to increment the timer, and means for identifying to the second device a phase of the first clock signal at the time the trigger signal is received. The phase of the first clock signal at the time the trigger signal is received may indicate a phase difference between first clock signal and a second clock signal that is used by the second device. The first time value is loaded into the timer in a cycle of the first clock signal that terminates at the first-occurring edge in the first clock signal.

In various aspects of the disclosure, a processor readable storage medium is disclosed. The storage medium may be a non-transitory storage medium and may store code that, when executed by one or more processors, causes the one or more processors to receive a first time value from a second device through the data communication link, the first time value corresponding to a future point in time, receive a trigger signal from the second device through the data communication link, load the first time value into the timer at a first-occurring edge in a first clock signal after the trigger signal is received, where the first clock signal is used to increment the timer, and identify to the second device a phase of the first clock signal at the time the trigger signal is received. The phase of the first clock signal at the time the trigger signal is received may indicate a phase difference between first clock signal and a second clock signal that is used by the second device. The first time value is loaded into the timer in a cycle of the first clock signal that terminates at the first-occurring edge in the first clock signal.

In various aspects of the disclosure, a method for synchronizing system time used by devices coupled to a data communication link may include determining a first time value that corresponds to a future point in system time at a first device, transmitting a second time value from the first device to a second device through the data communication link, the second time value being incrementally greater than the first time value, transmitting a trigger signal from the first device to the second device through the data communication link when the first time value is determined to match a value output by a system timer operated by the first device, where the system timer is clocked using a first clock signal, receiving from the second device an indication of phase of a second clock signal when the trigger signal was received by the second device, where the second clock signal is used by the second device to maintain a local timer, and calculating a phase difference between the first clock signal and the second clock signal. The indication of phase may be expressed as a number of periods of a third clock signal that is used by the second device, for example. The third clock signal may have a frequency that is a multiple of the frequency of the first clock signal. In one example, the third clock signal has a frequency that is 8 or 10 times the frequency of the first clock signal. The phase of the second clock signal at the time the trigger signal was received by the second device may indicate a difference between system time maintained by the system timer and local time maintained by the local timer. The first clock signal may have a lower frequency than the second clock signal.

In one aspect, the method includes entering a low-power mode of operation after transmitting the second time value to the second device, and transmitting the trigger signal to the second device while exiting the low-power mode of operation. The data communication link may be inactive during the low-power mode of operation.

In some examples, the first device is a modem and the second device is a radio frequency integrated circuit.

In various aspects of the disclosure, an apparatus may be adapted to determine a first time value that corresponds to a future point in system time at a first device, transmit a second time value from the first device to a second device through the data communication link, the second time value being incrementally greater than the first time value, transmit a trigger signal from the first device to the second device through the data communication link when the first time value is determined to match a value output by a system timer operated by the first device, where the system timer is clocked using a first clock signal, receive from the second device an indication of phase of a second clock signal when the trigger signal was received by the second device, where the second clock signal is used by the second device to maintain a local timer, and calculate a phase difference between the first clock signal and the second clock signal.

In various aspects of the disclosure, an apparatus may have means for determining a first time value that corresponds to a future point in system time at a first device, transmitting a second time value from the first device to a second device through the data communication link, the second time value being incrementally greater than the first time value, transmitting a trigger signal from the first device to the second device through the data communication link when the first time value is determined to match a value output by a system timer operated by the first device, where the system timer is clocked using a first clock signal, receiving from the second device an indication of phase of a second clock signal when the trigger signal was received by the second device, where the second clock signal is used by the second device to maintain a local timer, and calculating a phase difference between the first clock signal and the second clock signal.

In an aspect of the disclosure, a processor readable storage medium is disclosed. The storage medium may be a non-transitory storage medium and may store code that, when executed by one or more processors, causes the one or more processors to determining a first time value that corresponds to a future point in system time at a first device, transmitting a second time value from the first device to a second device through the data communication link, the second time value being incrementally greater than the first time value, transmitting a trigger signal from the first device to the second device through the data communication link when the first time value is determined to match a value output by a system timer operated by the first device, where the system timer is clocked using a first clock signal, receiving from the second device an indication of phase of a second clock signal when the trigger signal was received by the second device, where the second clock signal is used by the second device to maintain a local timer, and calculating a phase difference between the first clock signal and the second clock signal.

DETAILED DESCRIPTION

Figure 1:
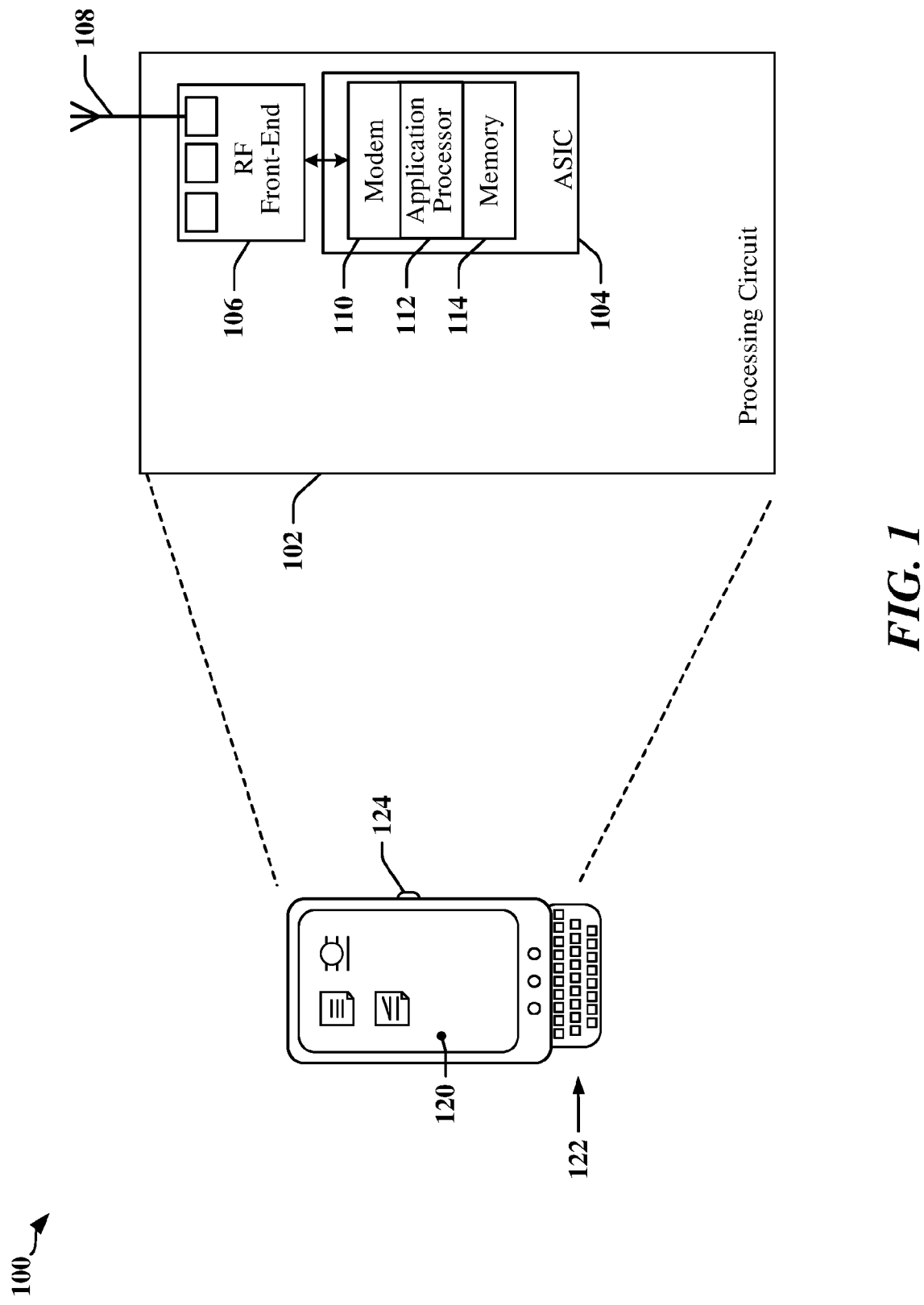
FIG. 1 illustrates an apparatus that includes a high-speed bus that may be adapted in accordance with certain aspects disclosed herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

Overview

Two devices in a system may synchronize timers when a first device provides a future system time value to a second device, and then launches a trigger signal to the second device when the first device timer matches the future system time value. As disclosed herein, time values may include representations of real time (e.g., time of day, date and time, etc.), a number representing a number of elapsed periods of a system or reference clock, and/or values to be directly loaded into a timer on the second device when the clock frequency used to clock the timer on the second device is known to the first device. The second device may load the time value to a holding register or timer, and may derive a local time value from a system time value received from the first device.

According to certain aspects, a capture mechanism in the second device includes a register that holds the future system time value until loaded into the timer in response to the trigger signal. The second device may include an oversampling circuit that uses a high frequency clock to limit the latency and uncertainty of the synchronization process. In one example, the trigger signal is oversampled using the high frequency clock, and offsets between trigger signal edges and edges in the timer output and/or the timer clock input are measured in clock periods of the high frequency clock. The time values in the first and second devices may be synchronized and timing uncertainty can be reduced to one clock period of the high-frequency clock through the use of the measured offsets. The trigger signal can be provided on an existing pin of IC devices embodying the first and second devices in accordance with communication protocols and specifications supported by the first and second devices (thus reusing the pin and providing the mechanism with no board cost).

In one example, the first device programs a future system time value in the second device. The first device launches a low-latency trigger signal that causes the future system time value to be loaded into a timer of the second device when a timer of the first device matches the future system time value. The second device may transmit a current time value to a first device. The second device receives a future system time value from the master device and loads a timer with the future system time value when the trigger signal is received from the master device such that corresponding timers in the first and second devices have the same value after the second device loads the timer with the future system time value.

The first device may include a baseband modem and/or an application processor while the second device may include a radio frequency integrated circuit and/or a radio frequency transceiver, for example. The timers in the first and second devices may be synchronized with less than 15 ns uncertainty. In one example, the first device knows the time value of the second device within a tolerance of ±15 ns.

The first and second devices may be coupled through a high-speed multi-wire interface. The trigger sent by first device may be carried in a signal defined in the protocols controlling the high-speed multi-wire interface. The second device may measure a phase difference between the trigger signal and edges of a clock signal used for timing by the second device. The phase difference is measured using an oversampling clock that has a frequency that is significantly greater than the clock signal used for timing by the second device. Here, the frequencies may differ by a factor of between approximately 10-20. The difference in frequencies is selected to provide a desired measurement reliability. The oversampling clock is provided to a counter that measures the offset between edges in a clock signal that increments system time and the received trigger. The phase difference is communicated to the first device and permits the first device to accurately determine system time as applied to the second device.

Example of an Apparatus with Multiple IC Device Subcomponents

Certain aspects of the invention may be applicable to communication links deployed between electronic devices that include subcomponents of an apparatus such as a telephone, a mobile computing device, an appliance, automobile electronics, avionics systems, or the like. FIG. 1 illustrates an example of an apparatus 100 that may employ a communication link between IC devices. In one example, the apparatus 100 may be a mobile communication device. The apparatus 100 may include a processing circuit having two or more IC devices 104, 106 that may be coupled using a first communication link. One IC device may be an RF front-end device 106 that enables the apparatus to communicate through one or more antennas 108 with a radio access network, a core access network, the Internet and/or another network. The RF front-end device 106 may include a plurality of devices coupled by a second communication link, which may include an RFFE bus.

The processing circuit 102 may include one or more application-specific IC (ASIC) devices 104. In one example, an ASIC device 104 may include and/or be coupled to one or more processing devices 112, logic circuits, one or more modems 110, and processor readable storage such as a memory device 114 that may maintain instructions and data that may be executed by a processor on the processing circuit 102. The processing circuit 102 may be controlled by an operating system and may provide or support an application programming interface (API) layer that enables execution of software modules residing in storage media. The memory device 114 may include read-only memory (ROM) or random-access memory (RAM), electrically erasable programmable ROM (EEPROM), flash cards, or any memory device that can be used in processing systems and computing platforms. The processing circuit 102 may include or have access to a local database or parameter storage that can maintain operational parameters and other information used to configure and operate apparatus 100. The local database may be implemented using one or more of a database module, flash memory, magnetic media, EEPROM, optical media, tape, soft or hard disk, or the like. The processing circuit may also be operably coupled to external devices such as the antennas 108, a display 120, operator controls, such as a button 124 and/or an integrated or external keypad 122, among other components.

Examples of Interfaces Coupling Devices in a Communication Device

According to certain aspects disclosed herein, an advanced digital interface may be provided between baseband and RF integrated circuits in mobile communication devices and the like. The advanced digital interface may optimize RF and baseband functions, including software and hardware functions. Device input/output pin count may be reduced, performance increased, and printed circuit board and/or chip carrier area usage minimized. The digital interface may be used to interconnect a baseband RF modem with a radio frequency integrated circuit (RFIC), providing reduced complexity of RF calibration when the baseband modem is mated with a suitable RFIC, providing an appropriate set of functions that optimizes chipset cost.

Figure 2:
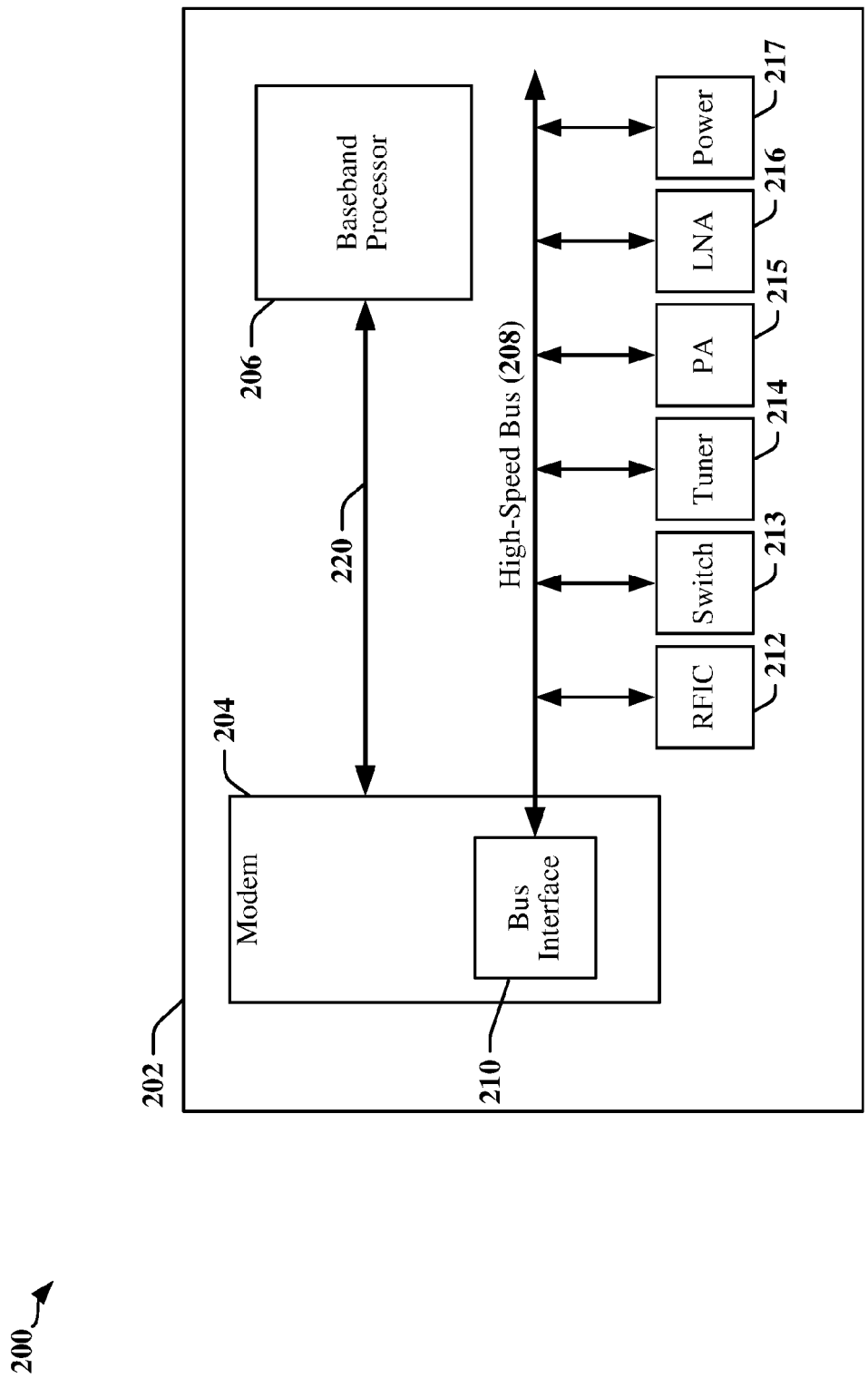
FIG. 2 illustrates a first example in which a high-speed bus is provided in a device that may be adapted according to certain aspects disclosed herein.

FIG. 2 illustrates a first example 200 in which a high-speed bus 208 and/or 220 is provided in a device 202 that may be adapted according to certain aspects disclosed herein. The device 202 may include one or more baseband processors 206, a baseband modem 204, various RF front-end devices 212-217, and one or more communication links or buses 220, 208. A low-latency, high-speed bus 208 may be deployed to couple various front-end devices 212-217 with a baseband modem 204. In some instances, the high-speed bus 208 deployed between the modem 204 and front-end devices 212-217 may be an RFFE or Qlink bus.

A digital interface provided between baseband modem 204 and the RFIC 212 and/or other RF front-end devices 213-217 may be adapted or configured to minimize traffic to the baseband modem and can provide low bandwidth overhead, low latency, and robust performance. A protocol may be used that allows for differentiated treatment of packets. For example, data and control packets may be distinguished and handled with different levels of error detection and correction. Moreover, multiple data rates may be supported and data reliably transported with low bandwidth overhead and low latency. A protocol may be used that does not require or employ line encoding. For example, a memory-mapped architecture may be implemented that automatically routes and stores packets in the correct memory locations at the destination. Protocols can be used that take advantage of the memory mapped architecture, providing simple address encoding and decoding and eliminating memory fragmentation. The protocols typically employed do not exhibit the complexity associated with segmentation and reassembly associated with conventional protocols. Synchronization and byte alignment may be achieved using configurable logic at the receiver, although byte alignment may not be required in some instances.

In the example 200 illustrated in FIG. 2, the device 202 may be embodied in one or more of a mobile computing device, a cellular phone, a smart phone, a session initiation protocol (SIP) phone, a laptop, a notebook, a netbook, a smartbook, a personal digital assistant (PDA), a satellite radio, a global positioning system (GPS) device, a smart home device, intelligent lighting, a multimedia device, a video device, a digital audio player (e.g., MP3 player), a camera, a game console, an entertainment device, a vehicle component, avionics systems, a wearable computing device (e.g., a smart watch, a health or fitness tracker, eyewear, etc.), an appliance, a sensor, a security device, a vending machine, a smart meter, a drone, a multicopter, or any other similar functioning device. In various examples, the device 202 can include other buses, devices and/or may perform other functions.

The RFIC 212 may include one or more controllers, and/or processors that configure and control certain aspects of the RF front-end and/or the operation of high-speed bus 208. The high-speed bus 208 may couple the RFIC 212 to a switch 213, an RF tuner 214, a power amplifier (PA) 215, a low noise amplifier (LNA) 216 and a power management module 217.

Figure 3:
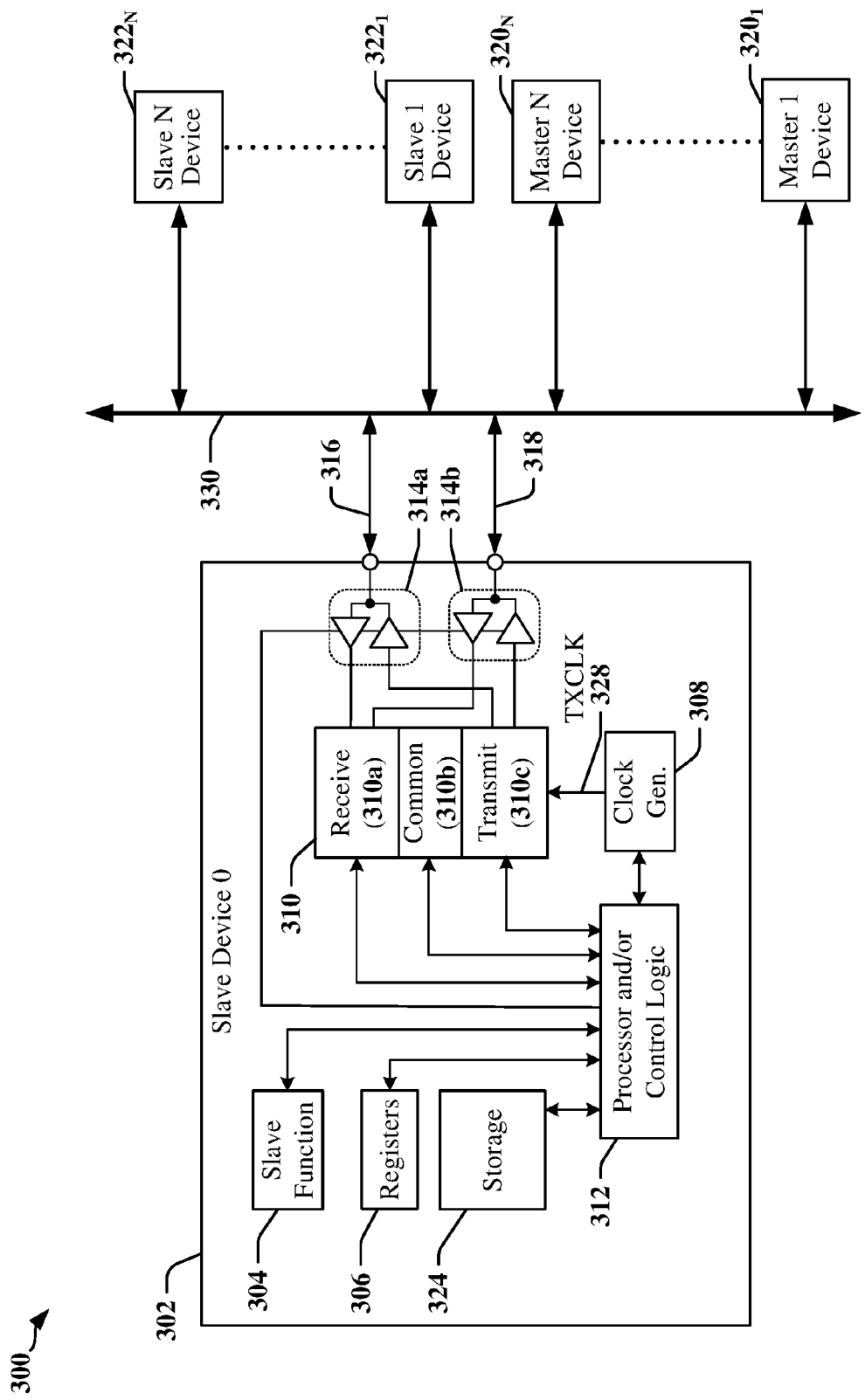
FIG. 3 illustrates a second example in which a high-speed bus is provided in a device that may be adapted according to certain aspects disclosed herein.

FIG. 3 illustrates a second example 300 in which a high-speed bus 330 is provided in a device that may be adapted according to certain aspects disclosed herein. The high-speed bus 330 may couple a plurality of bus master devices $320_1$-$320_N$ and slave devices 302 and $322_1$-$322_N$. The high-speed bus 330 may be configured according to application needs, and access to multiple buses 330 may be provided to certain of the devices $320_1$-$320_N$, 302, and $322_1$-$322_N$. In operation, one of the bus master devices $320_1$-$320_N$ may gain control of the bus and transmit a slave identifier (slave address) to identify one of the slave devices 302 and $322_1$-$322_N$ to engage in a communication transaction. Bus master devices $320_1$-$320_N$ may read data and/or status from slave devices 302 and $322_1$-$322_N$, and may write data to memory or may configure the slave devices 302 and $322_1$-$322_N$. Configuration may involve writing to one or more registers or other storage on the slave devices 302 and $322_1$-$322_N$.

In one example, a first slave device 302 coupled to the high-speed bus 330 may respond to one or more bus master devices $320_1$-$320_N$, which may read data from, or write data to the first slave device 302. In one example, the first slave device 302 may include or control a power amplifier (see the PA 215 in FIG. 2), and one or more bus master devices $320_1$-$320_N$ may from time-to-time configure a gain setting at the first slave device 302.

The first slave device 302 may include configuration registers 306 and/or other storage devices 324, a processing circuit and/or control logic 312, a transceiver 310 and a number of line driver/receiver circuits 314a, 314b as needed to couple the first slave device 302 to the high-speed bus 330. The processing circuit and/or control logic 312 may include a processor such as a state machine, sequencer, signal processor or general-purpose processor. The transceiver 310 may include one or more receivers 310a, one or more transmitters 310c and certain common circuits 310b, including timing, logic and storage circuits and/or devices. In some instances, the transceiver 310 may include encoders and decoders, clock and data recovery circuits, and the like. A transmit clock (TXCLK) signal 328 may be provided to the transmitter 310c, where the TXCLK signal 328 can be used to determine data transmission rates.

In one example, the high-speed bus 330 may be implemented as a serial bus in which data is converted from parallel to serial form by a transmitter, which transmits the encoded data as a serial bitstream. A receiver processes the received serial bitstream using a serial-to-parallel convertor to deserialize the data. The serial bus may include two or more wires, and a clock signal may be transmitted on one wire with serialized data being transmitted on one or more other wires. In some instances, data may be encoded in symbols, where each bit of a symbol controls the signaling state of a wire of the high-speed bus 330.

Figure 4:
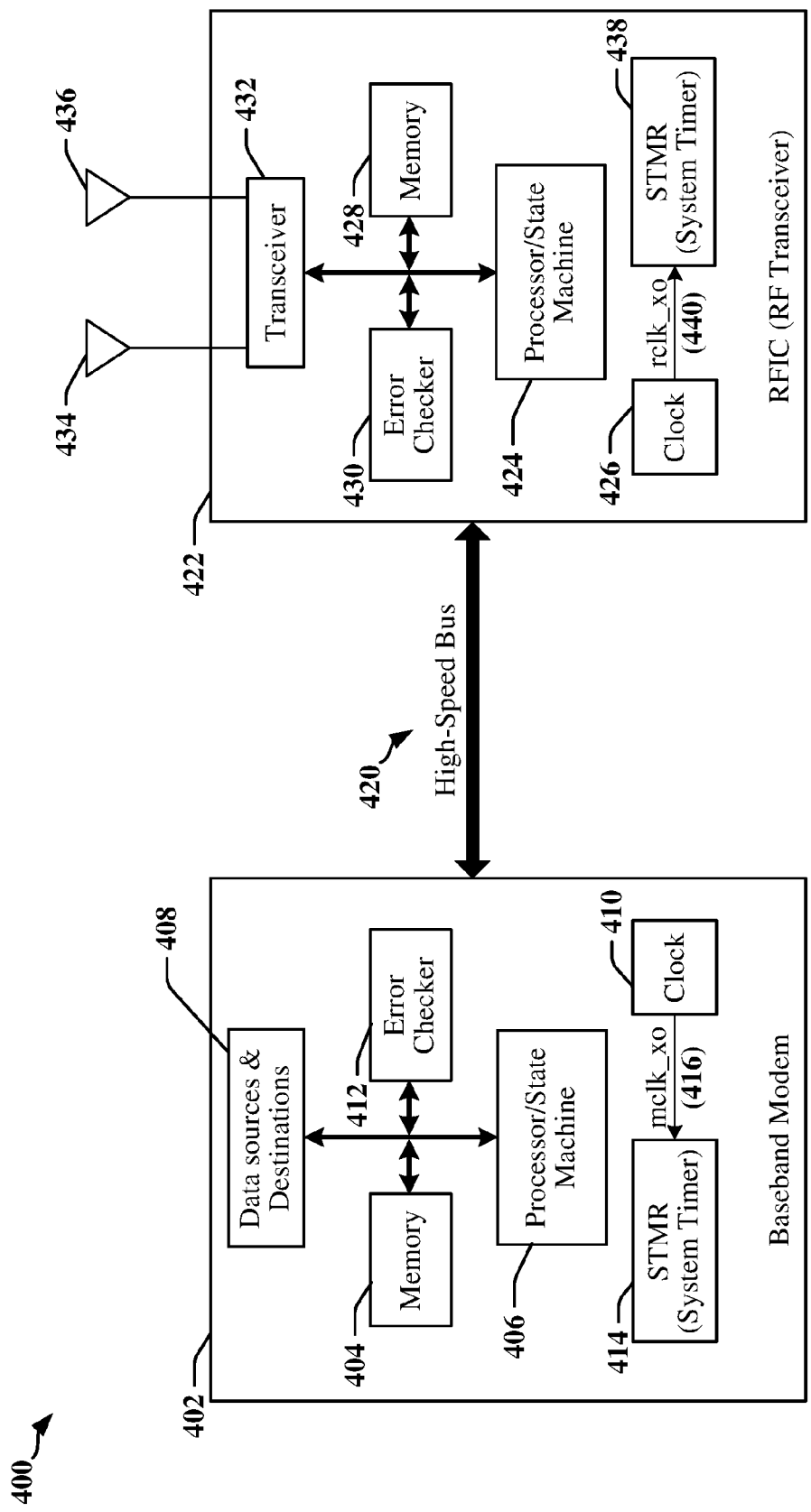
FIG. 4 illustrates a third example in which a high-speed bus is provided in a device that may be adapted according to certain aspects disclosed herein.

FIG. 4 illustrates a third example in which a high-speed bus 420 is provided in an apparatus 400 that may be adapted according to certain aspects disclosed herein. The high-speed bus 420 may be operated in accordance with RFFE and/or Qlink specifications and protocols, and may be configured to couple a baseband modem 402 with an RFIC 422. FIG. 4 illustrates certain features and elements associated with the operation of the high-speed bus 420 and may include other components including processors, storage, logic, etc.

The baseband modem 402 may include a state machine or processor 406 that controls communication over the high-speed bus 420. Information communicated over the high-speed bus 420 may be stored in a memory 404 that, in one example, may be configured to provide buffers between the high-speed bus 420 and data sources or destinations 408. The baseband modem 402 may include other circuits and modules associated with the high-speed bus 420, including error checking/correction circuits or modules 412, timers (including STMR 414), and clock generation, extraction and synchronization circuits 410.

The RFIC 422 may include a state machine or processor 424 that controls communication over the high-speed bus 420. Information communicated over the high-speed bus 420 may be stored in a memory 428 that, in one example, may be configured to provide buffers between the high-speed bus 420 and an RF transceiver 432. The RF transceiver 432 may be configured to communicate through one or more antennas 434, 436. The RFIC 422 may include other circuits and modules associated with the high-speed bus 420, including error checking/correction circuits or modules 430, timers (including STMR 438), and clock generation, extraction and synchronization circuits 426.

The state machines or processors 406, 424 may control communications over the high-speed bus 420 in response to control signaling transmitted on the high-speed bus 420, protocol header fields, error checking/correction circuits or modules 412, 430 and clock generation, extraction and synchronization circuits 410, 426. Clock signals may be generated using information derived from internal or external timing sources, and/or from received data signals. In some instances, a protocol may be employed that automatically copies data written to certain portions of one memory 404 or 428 to the other memory 428 or 404. For example, the state machine or processor 406 may determine that data has been written to a predetermined location in its local memory 404 and may further determine that the data should be automatically transmitted for storage in corresponding locations of the memory 428 of the RFIC 422. The state machine or processor 406 may configure a packet to carry the data, selecting an appropriate type field for the type of data. The state machine or processor 424 in the RFIC 422 determines the address for storing the transferred data in its local memory 428 based on the type field and/or destination field.

System Timer Synchronization

In various applications, different components coupled by a communication link are often required to coordinate certain activities, actions and tasks with one or more other devices, and/or to execute certain functions at specific system times, which may be defined by a system real-time schedule. System time may be maintained by an application processor or another device in a system-on-a-chip (SoC), an application-specific integrated circuit (ASIC) device or other system or circuit. In one example, one or more devices may be required to provide accurate timestamps related to events, where the timestamps are expressed in terms of a common system time.

The devices in a system may be synchronized to meet the overall system requirements using synchronized system timers. The synchronization of a timer across multiple devices in a system can be challenging where, for example, each device may be on a separate power domain, each device may power up at a different time, and/or each device may require different voltage levels. Implementing global synchronization can be difficult and costly.

Certain aspects disclosed herein provide low-latency, high-certainty synchronization for signaling between devices coupled through a high-speed interface. For the purposes of this disclosure, descriptions of a high-speed interface may refer to a Qlink interface and associated bus control signals. It will be appreciated that the concepts and features disclosed herein apply to various implementations of a high-speed interfaces, including RFFE and similar interfaces, for example. In other examples, a standards-defined or proprietary high-speed interface may be adapted to support implementation of certain concepts and features disclosed herein.

Figure 5:
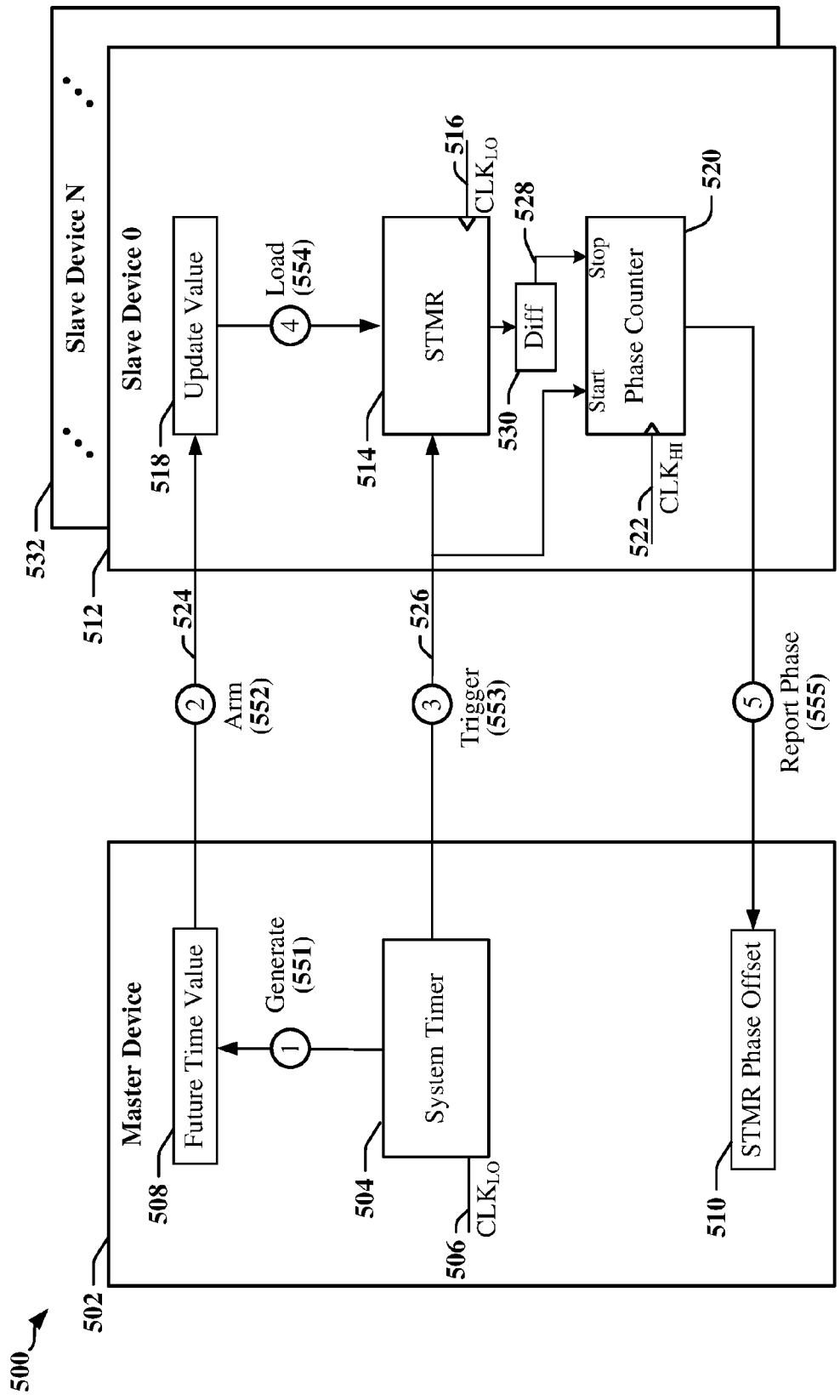
FIG. 5 illustrates system timer synchronization in accordance with certain aspects disclosed herein.

According to certain aspects disclosed herein, system timer synchronization may be accomplished using a signal to trigger a timer loading mechanism. FIG. 5 illustrates an example of a procedure that may be employed to synchronize system timers in an apparatus 500 that has been adapted according to certain aspects disclosed herein. In the example, a master device 502 maintains system time for the apparatus 500 using a system timer 504 that may be implemented using one or more counters, real-time clock circuits, general-purpose timers or other such device. The system timer 504 is clocked using a signal 506 that has a frequency that may be defined based on convention, protocol, specification, standards or design, for example. One or more slave devices 512 and/or 532 may track system time using a timer (e.g., the STMR 514 of slave device 512) that may be implemented using one or more counters, real-time clock circuits, general-purpose timers or other such device. The STMR 514 may be clocked using a signal 516 that has a frequency that is the same as or a multiple of the frequency of the corresponding signal 506 used by the master device 502. The master device 502 and one or more slave devices 512 and/or 532 may be communicatively coupled using a data communication link 524 and/or 526.

When synchronization of the STMR 514 is to be performed, the master device 502 may generate 551 a future time value 508. The master device 502 may arm 552 an update value register 518 in each of the one or more slave devices 512 and/or 532 by transferring the future time value 508 over the data communication link 524 before the occurrence of the time represented by the future time value 508. Upon occurrence of the time represented by the future time value 508, the master device 502 triggers loading of the content of the update value register 518 into the STMR 514 in each of the one or more slave devices 512 and/or 532 by launching a trigger signal 526. The trigger signal 526 may be transmitted over a low-latency transmission path that provides a high degree of timing certainty. The trigger signal 526 may be launched when the system timer 504 in the master device 502 has a value that is the same as, or corresponds to the future time value 508 and/or the content of the update value register 518. The trigger signal 526 causes the timer STMR 514 in each of the one or more slave devices 512 and/or 532 to acquire the armed value in the update value register 518. The trigger signal 526 may be transmitted through one or more existing pins and/or pads of IC devices housing the devices 502, 512, 532. The trigger signal 526 may be implemented using a signal defined by existing communication protocols and/or specifications. In one example, the STMR 514 may be loaded 554 using a load signal generated from the trigger signal 526, and a difference in phase between the system timer 504 in the master device 502 and the STMR 514 in the one or more slave devices 512 and/or 532 may result. The system timer 504 and the STMR 514 may be synchronized within desired or required uncertainty limits.

Any number of slave devices 512, 532 can be concurrently synchronized with the system time maintained by the master device 502. The master device 502 may arm update registers in multiple slave devices 512, 532 with the future time value 508, such that each slave device 512, 532 responds to the trigger signal 526 by loading the content of its update register into its system timer.

In some implementations, uncertainty may be reduced when one or more slave devices 512, 532 provide information regarding the phase difference between the system timer 504 and the STMR 514. In one example, a slave device 512 may oversample the trigger signal 526 using a high-frequency clock signal 522. The high-frequency clock signal 522 may have a frequency that is some multiple of the frequency of the signal 516 that clocks the STMR 514. In some examples, the high-frequency clock signal 522 has a frequency that is one or more orders of magnitude greater than the frequency of the signal 516 that clocks the STMR 514. By oversampling, the time between arrival of the trigger signal 526 and the loading of the STMR 514 may be measured. In one example, the arrival of a trigger edge in the trigger signal 526 starts a phase counter 520. Difference logic 530 may detect when the STMR 514 changes based on, for example, activation of a load input to the STMR 514 in response to the trigger signal 553, detection of completion of a load operation associated with the STMR 514, determining that a change in output of the STMR 514 has occurred, determining that the output of the STMR 514 matches the update value 518, etc. The difference logic may produce a stop signal 528 that stops the phase counter 520 when the update value 518 has been loaded into the STMR 514. The output of the phase counter 520 may be reported 555 to the master device 502 to be recorded as the phase offset 510 for the one or more slave devices 512 and/or 532. The master device 502 may record phase offsets 510 for multiple devices. The value of the output of the phase counter 520 may be used to calculate the phase difference between the system timer 504 and the STMR 514 based on the period of the high-frequency clock signal 522.

Figure 6:
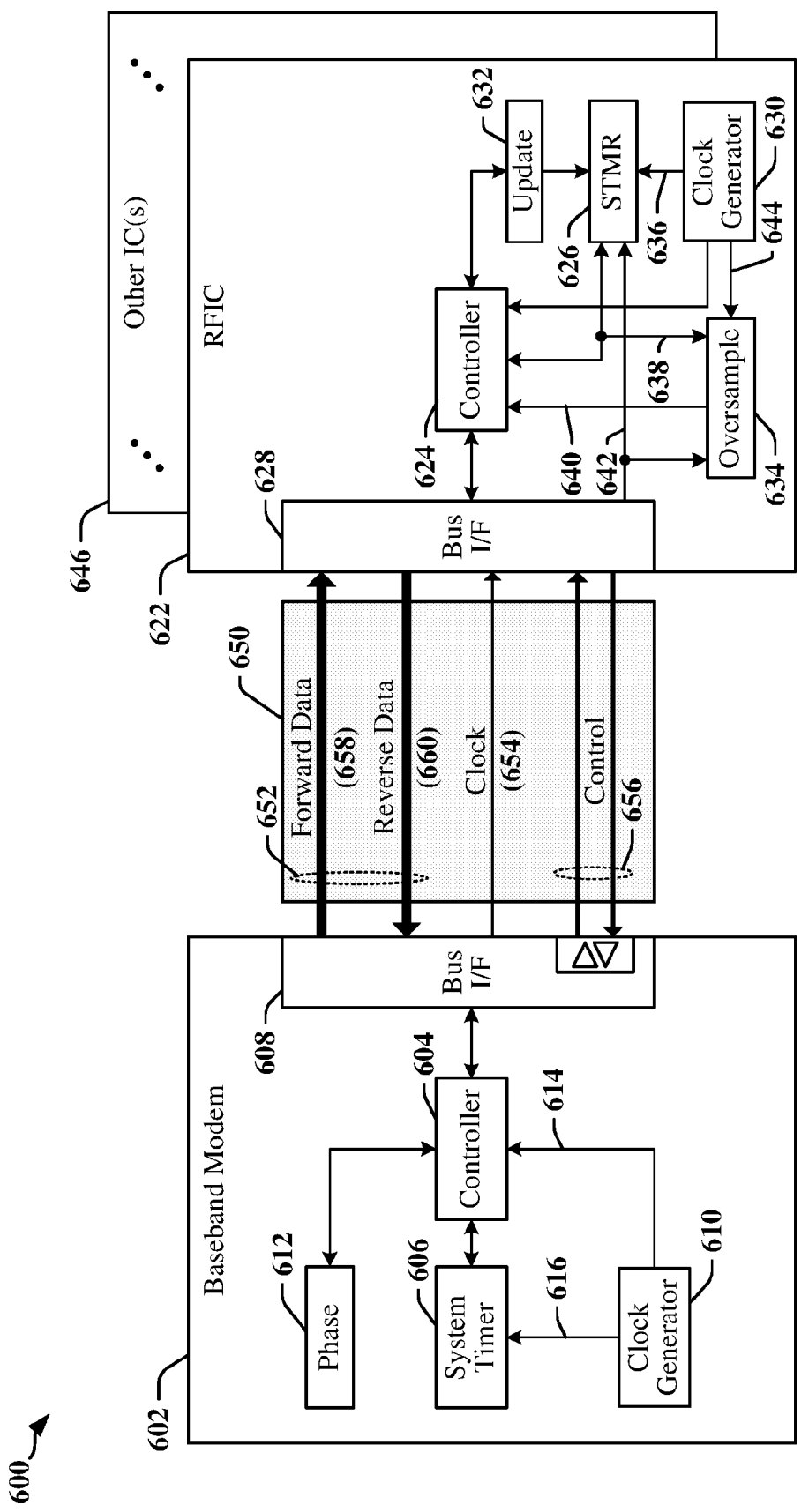
FIG. 6 illustrates certain aspects of an apparatus adapted to synchronize system timers in accordance with certain aspects disclosed herein.

FIG. 6 illustrates an apparatus 600 that may be adapted to synchronize system timers in accordance with certain aspects disclosed herein. FIG. 6 relates to an example in which the apparatus includes multiple devices including a baseband modem 602, an RFIC 622, and one or more other IC devices 646 that are coupled by high-speed bus 650. In some examples, more than two devices 622, 646 may be synchronized in response to signals transmitted by the baseband modem 602. In some examples, the high-speed bus 650 may be operated in accordance with RFFE and/or Qlink specifications and protocols. The baseband modem 602 may include a controller, state machine or processor 604 that controls an interface 608 used to couple the baseband modem 602 to the high-speed bus 650. The interface 608 may support data communications over one or more data channels 652 provided by the high-speed bus 650. Unidirectional data channels may be defined to support data transmissions from the baseband modem 602 to the RFIC 622 and/or other IC devices 646 (e.g., forward data channel 658), or data transmissions from the RFIC 622 and/or other IC devices 646 to the baseband modem 602 (e.g., reverse data channel 660). In some instances, a single bidirectional data channel may be defined on the high-speed bus 650. The RFIC 622 may include a controller, state machine or processor 624 that controls an interface 628 used to couple the RFIC 622 and/or the other IC devices 646 to the high-speed bus 650.

According to certain aspects, the process described in relation to FIG. 5 may be implemented to synchronize a timer (STMR 626) of the RFIC 622 and/or the other IC devices 646 with a system timer 606 of the baseband modem 602. The system timer 606 is clocked using a clock signal 616 provided by a clock generator 610. The clock signal 616 may have a frequency that is defined based on convention, protocol, specification, standards or design, for example. In the illustrated example, the RFIC 622 tracks system time using STMR 626, which may be implemented using one or more counters, real-time clock circuits, general-purpose timers or other such device. The STMR 626 may be clocked using a clock signal 636 provided by a clock generator 630. The clock signal 636 provided in the RFIC 622 may have a frequency that is the same as, or a multiple of the frequency of the corresponding clock signal 616 used by the baseband modem 602.

When synchronization of the STMR 626 is to be performed, the baseband modem 602 may transmit a future time value that is used to arm an update register 632 at the RFIC 622 (and optionally an update register in one or more of the other IC devices 646). The future time value may be transmitted over a data channel 652 of the high-speed bus 650. The baseband modem 602 may arm the update value register 632 in the RFIC 622 and/or corresponding update registers in the other IC devices 646 by transferring the future time value over the high-speed bus 650 before the occurrence of the time represented by the future time value. Upon occurrence of the time represented by the future time value, the baseband modem 602 triggers loading of the content of the update value register 632 into the STMR 626 by launching a trigger signal 642. The trigger signal 642 may be transmitted over a low-latency transmission path of the high-speed bus 650 that provides a high degree of timing certainty. In one example, the trigger signal 642 may be transmitted in a control signal 656 that has a low-latency transmission path between the baseband modem 602 and the STMR 626 in the RFIC 622 and/or corresponding timers in the other IC devices 646. The trigger signal 642 may be launched when the system timer 606 in the baseband modem 602 has a value that is the same as, or corresponds to the future time value and/or the content of the update value register 632 in the RFIC 622 and/or the other IC devices 646. The trigger signal 642 causes the timers in the RFIC 622 and/or the other IC devices 646 to acquire the previously armed value in update value registers. For example, the trigger signal 642 may cause the timer STMR 626 in the RFIC 622 to acquire the armed value in the update value register 632. The trigger signal 642 may be transmitted through one or more existing pins and/or pads of IC devices housing the devices 602, 622, 646. The trigger signal 642 may be implemented using a signal defined by existing communication protocols and/or specifications. The STMR 626 may be loaded using a load signal generated from the trigger signal 642, and a difference in phase between the system timer 606 in the baseband modem 602 and the STMR 614 in the RFIC 622 may result. In some instances, the difference may be small enough that the system timer 606 and the STMR 626 are synchronized within desired or required uncertainty limits.

In some implementations, uncertainty may be reduced when the RFIC 622 provides information regarding the phase difference between the system timer 606 and the STMR 626 in the RFIC 622 and/or the phase difference between the system timer 606 and corresponding timers in the other IC devices 646. In one example, the RFIC 622 may oversample the trigger signal 642 using an oversampling clock signal such as the high-frequency clock signal 644. The high-frequency clock signal 644 may have a frequency that is some multiple of the frequency of the clock signal 636 that clocks the STMR 626. In some examples, the high-frequency clock signal 644 has a frequency that is one or more orders of magnitude greater than the frequency of the clock signal 636 that clocks the STMR 626. By oversampling, the time between arrival of the trigger signal 642 and the loading of the STMR 626 may be measured. In one example, the arrival of a trigger edge in the trigger signal 642 starts an oversampling counter 634. Difference logic may detect when the STMR 626 changes based on, for example, activation of a load input to the STMR 626 in response to the trigger signal 642, detection of completion of a load operation associated with the STMR 626, determining that a change in output of the STMR 626 has occurred, determining that the output of the STMR 626 matches the update value 632, etc. The difference logic may produce a stop signal 638 that stops the oversampling counter 634 when the update value 632 has been loaded into the STMR 626. The output of the oversampling counter 634 may be reported to the baseband modem 602 through the high-speed bus 650 for recording as the phase offset 612 for the RFIC 622. The value of the output of the oversampling counter 634 may be used to calculate the phase difference between the system timer 606 and the STMR 626 based on the period of the high-frequency clock signal 644.

Example of a Mobile Device Transceiver

Figure 7:
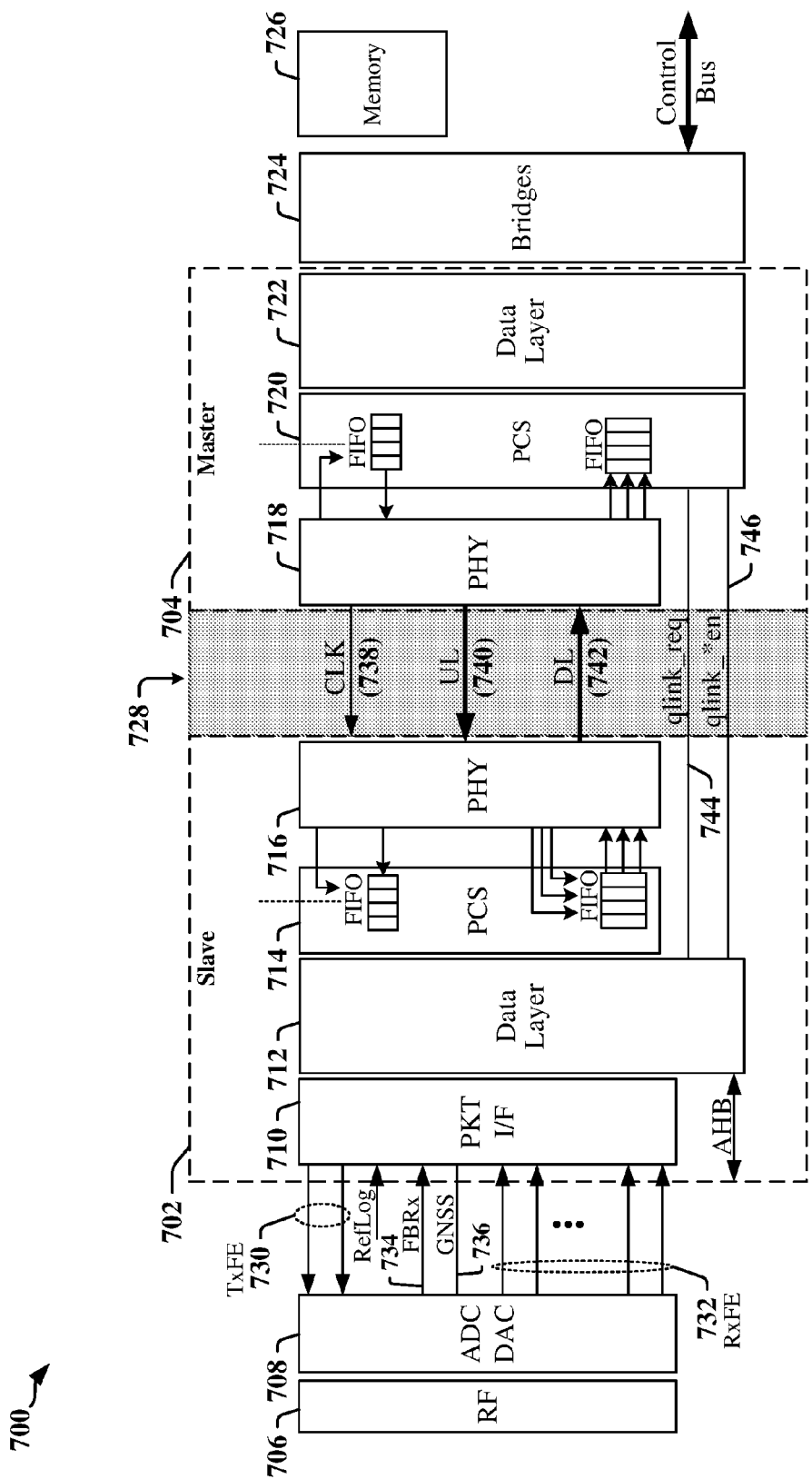
FIG. 7 illustrates an example of a transceiver apparatus that may be used in a mobile telephone handset or other electronic communication device in accordance with certain aspects disclosed herein.

FIG. 7 is a diagram illustrating an example of a transceiver apparatus 700 that may be used in a mobile telephone handset or other electronic communication device that may be adapted in accordance with certain aspects disclosed herein. The transceiver apparatus 700 includes a slave device 702 and a master device 704. The transceiver apparatus 700 also includes an RF block 706. The RF block 706 may include various circuits related to the transmission and reception of RF signals. The RF block 706 may include one or more antennas. Additionally, the RF block 706 may include one or more RF filters or other RF processing circuits.

The transceiver apparatus 700 illustrated in FIG. 7 also includes a block (ADC/DAC block 708) that includes an analog-to-digital converter (ADC) and a digital-to-analog converter (DAC). The ADC/DAC block 708 may be used to convert received RF analog signals to digital signals in the ADC portion of the ADC/DAC block 708. For example, RF signals received at an antenna in the RF block 706 may be filtered or otherwise processed in the RF block 706 and/or converted to digital signals using the ADC in the ADC/DAC block 708. In some instances, received RF signals may be converted to digital signals directly. Received RF signals may be converted to digital signals after certain analog processing has been performed to assist conversion to digital signals. In other instances, received RF signals may be converted to digital signals after down-conversion to baseband analog signals. Digital filtering and other digital processing may be performed on the digital versions of the received RF signals.

The ADC/DAC block 708 may be used to convert digital signals to analog signals in the DAC portion of the ADC/DAC block 708. For example, digital signals received by the ADC/DAC block 708 from a packet interface (PKT I/F block 710) may be converted to analog RF signals using the DAC portion of the ADC/DAC block 708. The RF version of the digital signals received by the ADC/DAC block 708 from the PKT I/F block 710 may then be processed using RF filters and other RF processing circuits. The RF version of the digital signals received by the ADC/DAC block 708 from the PKT I/F block 710 may be transmitted using the one or more antennas provided or driven by the RF block 706.

An interface may be defined to support communication between the ADC/DAC block 708 and the PKT I/F block 710. For example, digital signals that are to be ultimately transmitted through an antenna coupled to or provided within the RF block 706 may be sent from the PKT I/F block 710 using the transmit front-end signals (TxFE signals 730). Digital signals may be sent from the ADC/DAC block 708 to the PKT I/F block 710 using the receive front-end signals (RxFE signals 732). The ADC/DAC block 708 may provide feedback to the PKT I/F block 710 over the feedback receiver signal (FBRx 734). In communications systems including position/location functionality, the ADC/DAC block 708 may also provide global navigation satellite system signals, represented by the GNSS signal 736.

The PKT I/F block 710 is coupled to the data block 712. The data block 712 is a block which manages access to the data. For example, the data block 712 may provide the ADC/DAC block 708 with access to the uplink data. The data block 712 may provide access to the downlink data by a physical coding sublayer, represented here as PCS block 714. The data block 712 may implement a protocol adapted to transfer data between adjacent nodes, or other nodes. The data block 712 may provide the functional and procedural means to transfer data between network entities and may provide the means to detect and possibly correct errors that may occur in the physical block.

The data block 712 is coupled to the PCS block 714 in the slave device 702. The PCS block 714 in the slave device 702 may include asynchronous first-in-first-out (FIFO) buffers for data storage. FIFOs may be provided for the uplink data and for the downlink data in the PCS block 714 in the slave device 702. The PCS block 714 may be a networking protocol sublayer that resides on top of the physical layer (PHY), represented here as the PHY block 716. The PCS block 714 is coupled to the PHY block 716 and provides an interface between the data block 712 and the PHY block 716.

The PHY block 716, within the slave device 702 is coupled to the PHY block 718 in the master device 704 through a communication link 728, which may be a Qlink interface for example. The master device 704 provides a clock signal (CLK 738) to the slave device 702. The master device 704 also provides uplink data 740 to the slave device 702. The slave device 702 provides downlink data 742 to the master device 704. These connections are maintained through the operation of the PHY block 716 in the slave device 702 and the PHY block 718 in the master device 704.

The PHY block 718 in the master device 704 is coupled to a PCS block 720. A data block 722 coupled to the PCS block 714 may be implemented to manage data flow through the PCS block 720. The PCS block 720 is a networking protocol sublayer that resides on top of the PHY block 718 and provides an interface between the data block 722 and the PHY block 718. The data block 722 may implement a protocol adapted to transfer data between adjacent nodes. The data block 722 may provide the functional and procedural means to transfer data between network entities and may provide the means to detect and possibly correct errors that may occur in the PHY block 718.

The PCS block 720 may include asynchronous FIFO buffers for data storage. For example, FIFOs may be provided for uplink data and downlink data in the PCS block 720 that is within the master device 704.

The data block 722 in the master device 704 may be used to provide data to interconnect bridges 724. The interconnect bridges 724 may provide data to the data block 722 for the uplink data 740. For example, the interconnect bridge 724 may read and write data from a memory 726. Data read from the memory 726 may include the uplink data 740. Downlink data 742 may be written to the memory 726 by the interconnect bridges 724. Control signals may be used to control the interconnect bridges 724.

The slave device 702 may assert a request signal (qlink_req signal 744) to wake up the master device 704. The master device 704 may use an enable signal (qlink_*en signal 746) to serve as an active low signal to enable the slave device 702.

Example of System Timer Synchronization in a Mobile Device Transceiver

Figure 8:
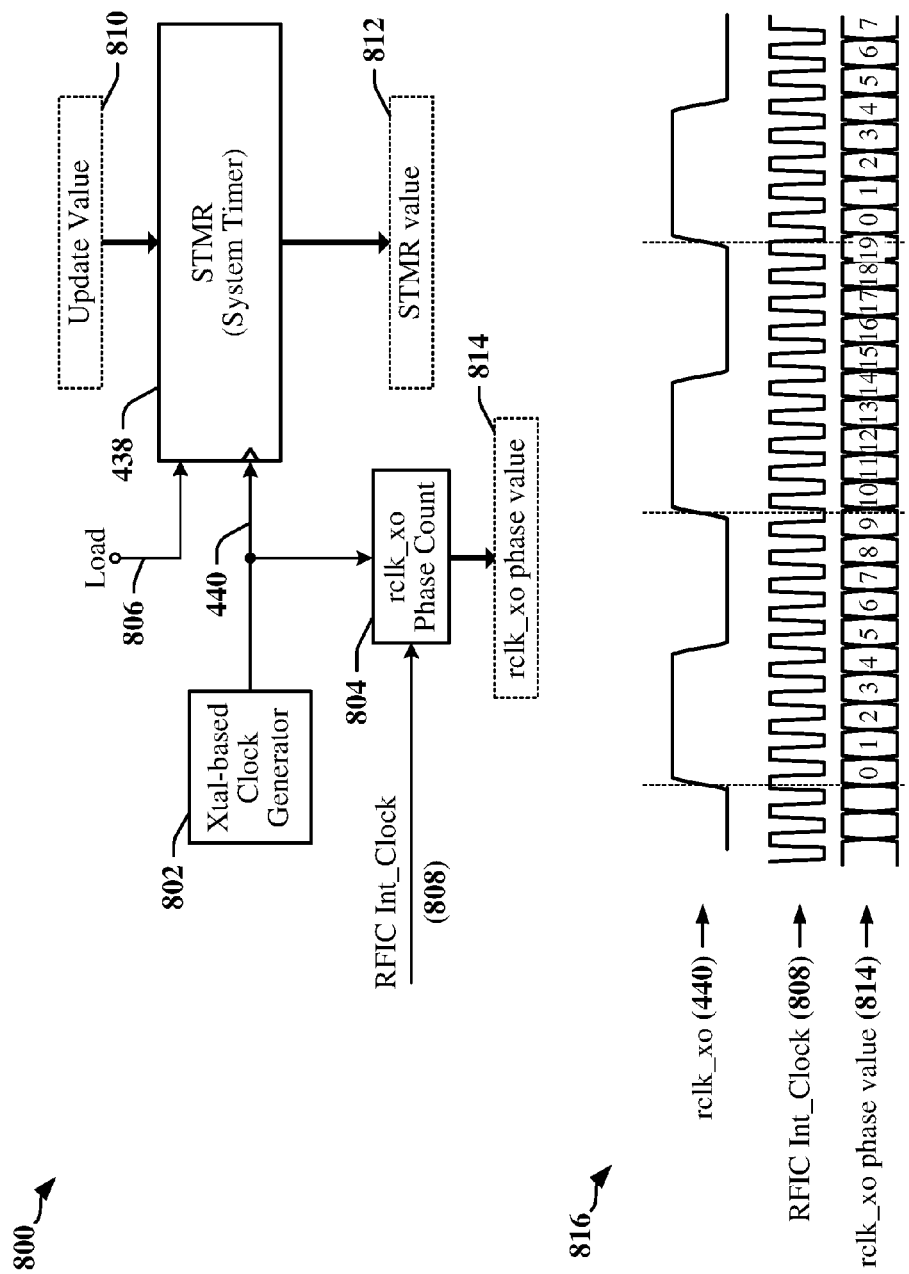
FIG. 8 illustrates an example of an apparatus that may be used to determine the phase of the clock signal in accordance with certain aspects disclosed herein.
Figure 9:
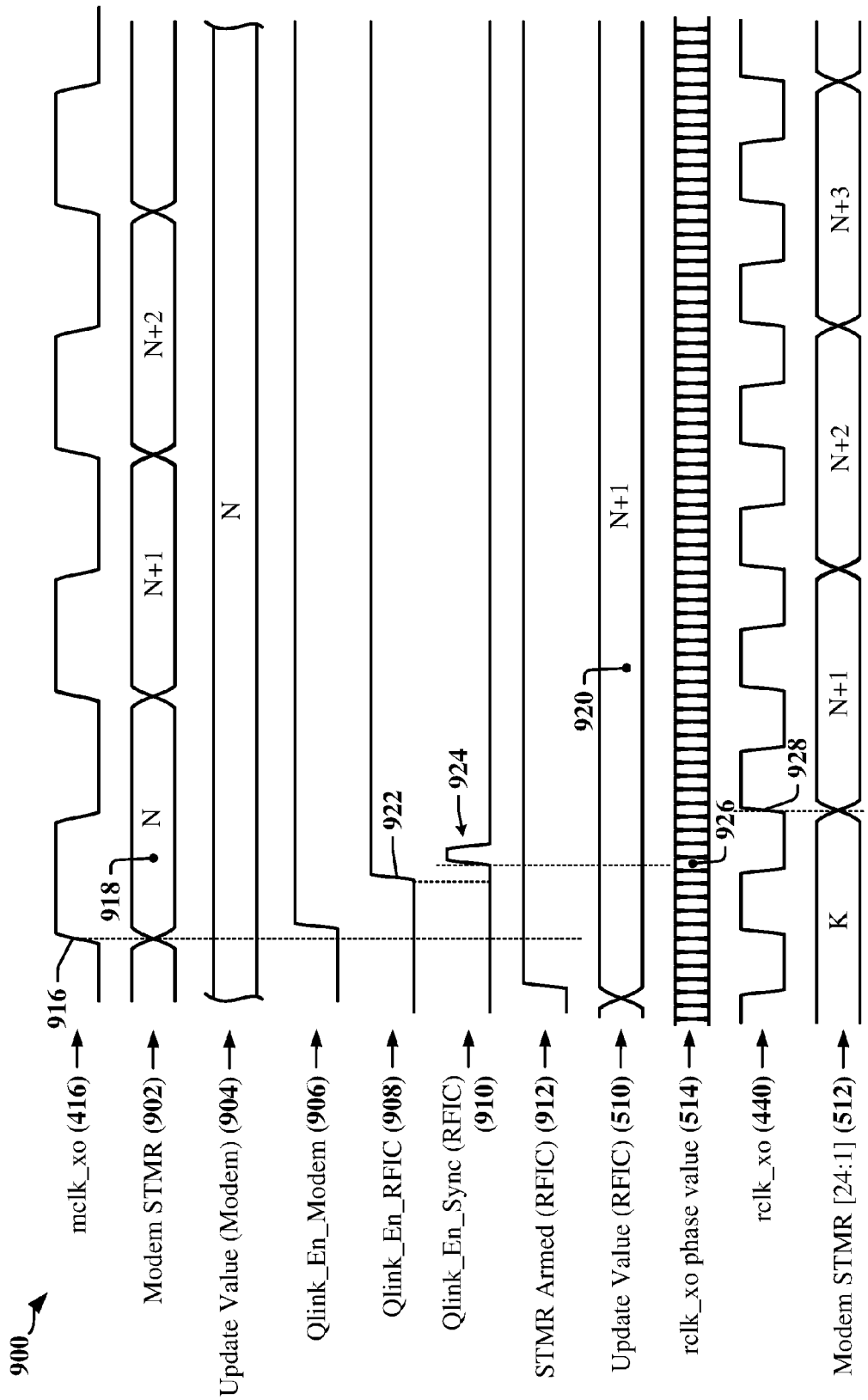
FIG. 9 illustrates timing associated with a procedure for synchronizing system timers in accordance with certain aspects disclosed herein.

FIGS. 8 and 9 illustrate an example of apparatus and processes that can be used to synchronize system timers and to determine the phase of a clock signal in a first device relative to a clock signal in a second device. It is contemplated that the other circuits and configurations of devices and modules may be employed to determine or measure the phase a clock signal in accordance with certain principles disclosed herein. FIGS. 8 and 9 relate to an example of system clock synchronization in an RFFE application in an apparatus such as the apparatus 400 of FIG. 4 or the transceiver apparatus 700 of FIG. 7.

In the example illustrated in FIG. 4, the baseband modem 402 and RFIC 422 include internal system timers (STMR 414 and STMR 438, respectively), which may require synchronization to meet or support protocol requirements and/or specifications governing the operation of the system. In one example, the STMR 414 and the STMR 438 may include timers that are required to be synchronized with one another within a 12 ns tolerance. In many implementations, specifications and protocols do not define an inherent time transfer mechanism that would permit coordination of the STMR 414 and STMR 438 located in different SoCs, ASICs or other circuits. In some instances, the baseband modem 402 may periodically transmit the value of its STMR 414 over the high-speed bus 420 (through a Qlink interface, for example) to the RFIC 422 in order to provide an accurate mechanism to monitor and/or trigger events in the RFIC 422. Events that may be triggered include triggers for an ADC, triggers for a DAC, time stamping, and global navigation satellite system (GNSS) time transfers.

According to certain aspects disclosed herein, an interface may be adapted or configured to reliably transfer the value of STMR 414 from the baseband modem 402 to the RFIC 422 with a known latency and with the lowest possible uncertainty. In one example, a 24-bit STMR 414 in the baseband modem 402 is clocked by a signal (mclk_xo signal 416) derived from a 19.2 MHz crystal oscillator. A 25-bit STMR 438 in the RFIC 422 is clocked by a signal (rclk_xo signal 440) derived from a 38.4 MHz crystal oscillator. A synchronization protocol is disclosed that provides sufficient accuracy to set the 24 most significant bits of the STMR 438 in the RFIC 422 to match the STMR 414 in the baseband modem 402. The least-significant bit (LSB) of the STMR 438 in the RFIC 422 provides additional timing granularity for circuits and functions performed within the RFIC 422.

Certain aspects disclosed herein relate to a method by which the differences in clock phase between the two devices may be measured. FIG. 8 illustrates an example of an apparatus 800 that may be used to determine the phase of the clock signal (rclk_xo signal 440) in the RFIC 422. FIG. 8 includes a timing diagram 816 that illustrates the operation of the apparatus 800 used to determine the phase of the rclk_xo signal 440. During synchronization, the phase of the clock signal (rclk_xo signal 440) may be read when a strobe signal is generated in the RFIC 422 from a trigger signal received during timer synchronization. This phase information may be provided to the baseband modem 402, which may use the information to more accurately characterize the timing relationship between the STMR 414 in the baseband modem 402 and the STMR 438 in the RFIC 422.

The rclk_xo signal 440 used or generated by the RFIC 422 may be derived from a crystal oscillator 802. In one example, the rclk_xo signal 440 has a frequency of 38.4 MHz and is used to clock the STMR 438. The STMR 438 outputs a current value of the STMR 438 (illustrated as the 24 most significant bits 812). The current value of the STMR 438 may be modified by counting or by loading an update value 810 under control of a load signal 806, which may be provided in the form of a strobe or pulse signal. The rclk_xo signal 440 may be provided to a phase counter 804 that is driven by a high-frequency internal clock 808 of the RFIC 422. In one example, the internal clock 808 has a frequency of 376 MHz, which is sufficient to oversample the rclk_xo signal 440. In this example, the internal clock 808 has a frequency that is almost 10 times greater than the frequency of the rclk_xo signal 440 and almost 20 times greater than the frequency of the mclk_xo signal 416. The phase counter 804 may be reset after two cycles of the rclk_xo signal 440, which corresponds to one cycle of the mclk_xo signal 416. The phase counter 804 provides an output representing current rclk_xo signal phase value 814 that, in this example, ranges from 0-19.

FIG. 9 illustrates timing associated with a procedure for synchronizing the STMR 414 in the baseband modem 402 and the STMR 438 in the RFIC 422. In one example, synchronization may be performed when a communication link emerges from hibernation, after reset or as defined or required by the application of the procedure. In other examples, synchronization may be performed periodically based on known differences in clock frequencies of the two devices (clock drift). In the illustrated example, the baseband modem 402 communicates with the RFIC 422 using a Qlink protocol that defines an enable signal (Qlink_En_Modem 906) transmitted by the baseband modem 402 to initiate one or more communication transactions after the link is reset or emerges from a deep sleep. In some implementations, Qlink_En_Modem 906 may be used as a trigger that initiates synchronization of the STMRs 414, 438. The RFIC 422 receives a delayed version of Qlink_En_Modem 906 as Qlink_En_RFIC 908. According to certain aspects, the RFIC 422 may generate a synchronization signal (Qlink_En_Sync 910) that can be used to trigger synchronization of the STMR 414 in the baseband modem 402 and the STMR 438 in the RFIC 422.

In some examples, synchronization of the STMRs 414 and 438 may be initiated when the communication link transitions, or is expected to transition through a power state that requires Qlink_En_Modem 906 to be asserted. The synchronization process may include transferring the universal STMR value from the baseband modem 402 to the RFIC 422 with the highest possible accuracy and the lowest uncertainty. Synchronization may be configured while the link is active, when an update STMR value 904 is programmed or configured in the baseband modem 402 and an "arm" bit or flag is set. In the example, the update STMR value 904 is set to have a value "N." Setting the arm bit/flag may cause the link to update the STMR value when the link next transitions from a deep sleep state into low-speed mode or high-speed mode of communication. The baseband modem 402 configures an STMR armed value 920 in the RFIC 422. Here the STMR armed value 920 of "N+1" is stored as the update value 810 for the STMR 438 of the RFIC 422. In one example, the update value 810 may be stored in a register that can be addressed by the baseband modem 402. In another example, the update value 810 may be received by the RFIC 422, which may then load the register update value 810 into a suitable register. When the rclk_xo signal 440 has frequency that is double the frequency of the mclk_xo signal 416, the value of the 24 most significant bits of the STMR 438 in the RFIC 422 match the update STMR value 904 maintained at the baseband modem 402.

The baseband modem 402 may then execute the sequence of functions and/or actions required to exit from deep-sleep mode before the time corresponding to the STMR armed value 912 occurs. Having exited the deep-sleep mode, the baseband modem 402 may wait to assert Qlink_En_Modem 906 until its STMR 414 has the value programmed as the update STMR value 904 (i.e., STMR 414 has the value "N"). The baseband modem 402 may then set Qlink_En_Modem 906. In one example, combinational logic may be configured to compare STMR 414 with the update STMR value 904 and to assert Qlink_En_Modem 906 when a match occurs.

The Qlink_En_Modem 906 propagates through input/output pads and/or pins of the baseband modem 402, and thence through conductors on a circuit board, chip carrier or substrate to the RFIC 422 which captures the delayed Qlink_En_RFIC 908 as Qlink_En_Modem 906. In one example, the RFIC 422 captures the delayed Qlink_En_RFIC 908 using a metastability-hardened flip-flop, which may be clocked by a high-frequency internal clock 808 of the RFIC 422 to minimize uncertainty. The high-frequency internal clock 808 of the RFIC 422 may have a frequency of 376 MHz, for example, and the uncertainty may be limited to a single 376 MHz clock period. A metastability-hardened flip-flop may include, for example, a flip-flop that has multiple stages clocked by a synchronizing clock in a manner that prevents the flip-flop from entering a state characterized by output instability arising from setup and hold time violations, which may be caused by variations in process, voltage and temperature (PVT) conditions.

A strobe or pulse 924 in Qlink_En_Sync 910 is generated from the rising edge 922 of Qlink_En_RFIC 908, which has been synchronized to the high-frequency internal clock 808 of the RFIC 422. That is, the rising edge of the strobe or pulse 924 is synchronized to an edge of the high-frequency internal clock 808. The strobe or pulse 924 is used to read the phase value 928 of the rclk_xo signal 440 provided by the phase counter 804. The phase value 114 of the rclk_xo signal 440 may be stored in a phase capture register, for example, and the phase capture register may be read by the baseband modem 402.

The update value 810 (here the armed value 920) is loaded into the STMR 438 of the RFIC 422 at the next rising edge 928 of the rclk_xo signal 440. The baseband modem 402 may read the phase value 928 stored in the phase capture register. The baseband modem 402 may calculate the difference in timing between the phase of the mclk_xo signal 416 in the baseband modem 402 and the phase of the rclk_xo signal 440 in the RFIC 442. These calculated timing differences can enable the baseband modem 402 to characterize time in the RFIC 442 with a tolerance of ±1 period of the high-frequency internal clock 808 of the RFIC 422.

The baseband modem 402 and/or the RFIC 442 may be designed to limit the uncertainty associated with STMR 414, 438 synchronization. For example, a shortest possible path may be provided between the last flip-flop, register, gate to the pad associated with the Qlink_En_Modem 906 in the baseband modem 402, from the modem pad to a corresponding RFIC pad in the RFIC 442, and from the RFIC pad to a flip-flop, register, gate associated with the Qlink_En_RFIC 908 in the RFIC 442. A short path for transmitting Qlink_En_Modem 906 can limit variations in propagation timing associated with PVT effects.

Examples of Processing Circuits and Methods

Figure 10:
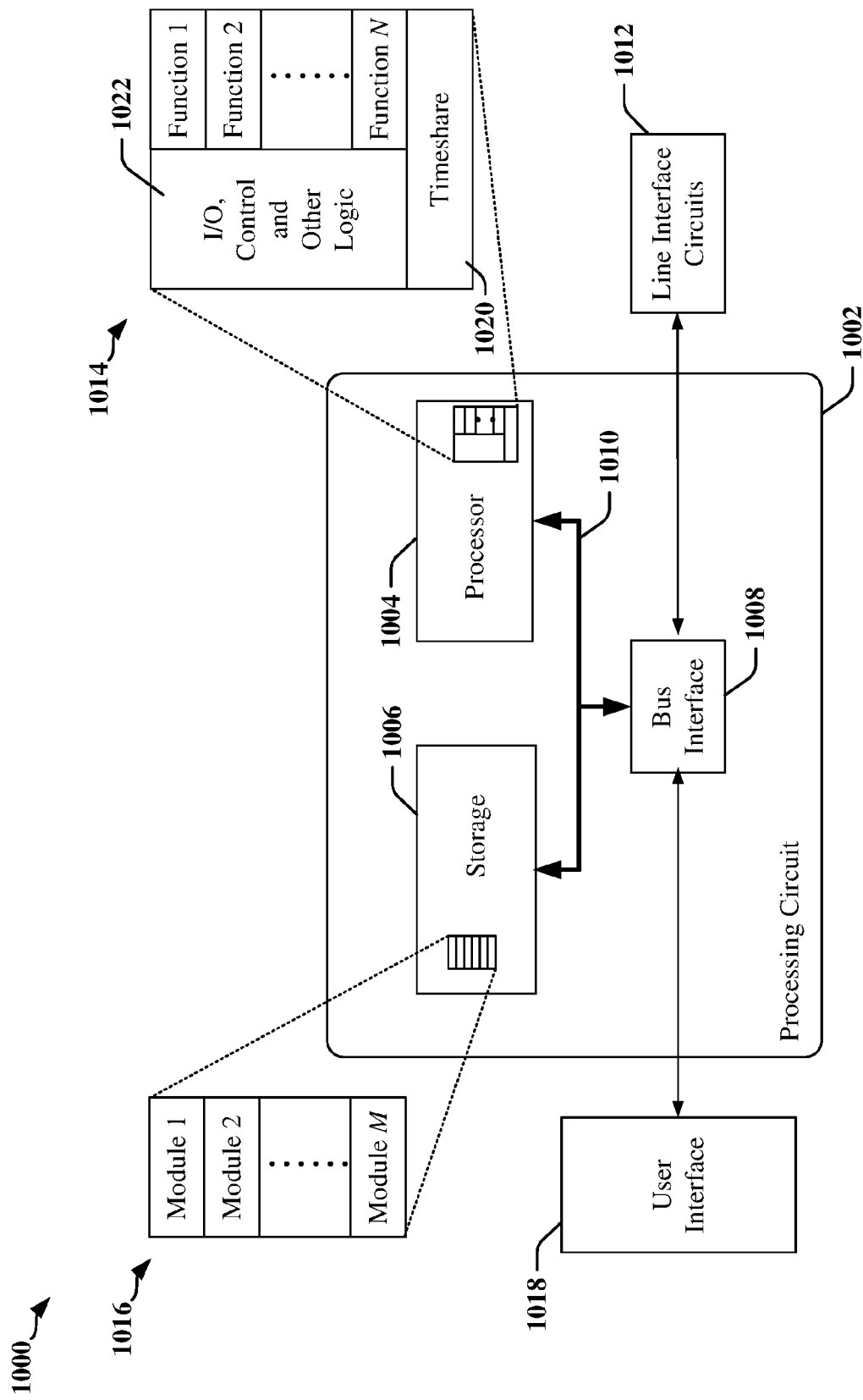
FIG. 10 is a block diagram illustrating an example of an apparatus employing a processing circuit that may be adapted to certain aspects disclosed herein.

FIG. 10 is a conceptual diagram illustrating a simplified example of a hardware implementation for an apparatus 1000 employing a processing circuit 1002 that may be configured to perform one or more functions disclosed herein. In accordance with various aspects of the disclosure, an element, or any portion of an element, or any combination of elements as disclosed herein may be implemented using the processing circuit 1002. The processing circuit 1002 may include one or more processors 1004 that are controlled by some combination of hardware and software modules. Examples of processors 1004 include microprocessors, microcontrollers, digital signal processors (DSPs), ASICs, field programmable gate arrays (FPGAs), programmable logic devices (PLDs), state machines, sequencers, gated logic, discrete hardware circuits, and other suitable hardware configured to perform the various functionality described throughout this disclosure. The one or more processors 1004 may include specialized processors that perform specific functions, and that may be configured, augmented or controlled by one of the software modules 1016. The one or more processors 1004 may be configured through a combination of software modules 1016 loaded during initialization, and further configured by loading or unloading one or more software modules 1016 during operation.

In the illustrated example, the processing circuit 1002 may be implemented with a bus architecture, represented generally by the bus 1010. The bus 1010 may include any number of interconnecting buses and bridges depending on the specific application of the processing circuit 1002 and the overall design constraints. The bus 1010 links together various circuits including the one or more processors 1004, and storage 1006. Storage 1006 may include memory devices and mass storage devices, and may be referred to herein as computer-readable media and/or processor-readable media. The bus 1010 may also link various other circuits such as timing sources, timers, peripherals, voltage regulators, and power management circuits. A bus interface 1008 may provide an interface between the bus 1010 and one or more transceivers 1012. A transceiver 1012 may be provided for each networking technology supported by the processing circuit. In some instances, multiple networking technologies may share some or all of the circuitry or processing modules found in a transceiver 1012. Each transceiver 1012 provides a means for communicating with various other apparatus over a transmission medium. Depending upon the nature of the apparatus 1000, a user interface 1018 (e.g., keypad, display, speaker, microphone, joystick) may also be provided, and may be communicatively coupled to the bus 1010 directly or through the bus interface 1008.

A processor 1004 may be responsible for managing the bus 1010 and for general processing that may include the execution of software stored in a computer-readable medium that may include the storage 1006. In this respect, the processing circuit 1002, including the processor 1004, may be used to implement any of the methods, functions and techniques disclosed herein. The storage 1006 may be used for storing data that is manipulated by the processor 1004 when executing software, and the software may be configured to implement any one of the methods disclosed herein.

One or more processors 1004 in the processing circuit 1002 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1006 or in an external computer readable medium. The external computer-readable medium and/or storage 1006 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium and/or storage 1006 may also include, by way of example, a carrier wave, a transmission line, and any other suitable medium for transmitting software and/or instructions that may be accessed and read by a computer. Computer-readable medium and/or the storage 1006 may reside in the processing circuit 1002, in the processor 1004, external to the processing circuit 1002, or be distributed across multiple entities including the processing circuit 1002. The computer-readable medium and/or storage 1006 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 1006 may maintain software maintained and/or organized in loadable code segments, modules, applications, programs, etc., which may be referred to herein as software modules 1016. Each of the software modules 1016 may include instructions and data that, when installed or loaded on the processing circuit 1002 and executed by the one or more processors 1004, contribute to a run-time image 1014 that controls the operation of the one or more processors 1004. When executed, certain instructions may cause the processing circuit 1002 to perform functions in accordance with certain methods, algorithms and processes described herein.

Some of the software modules 1016 may be loaded during initialization of the processing circuit 1002, and these software modules 1016 may configure the processing circuit 1002 to enable performance of the various functions disclosed herein. For example, some software modules 1016 may configure internal devices and/or logic circuits 1022 of the processor 1004, and may manage access to external devices such as the transceiver 1012, the bus interface 1008, the user interface 1018, timers, mathematical coprocessors, and so on. The software modules 1016 may include a control program and/or an operating system that interacts with interrupt handlers and device drivers, and that controls access to various resources provided by the processing circuit 1002. The resources may include memory, processing time, access to the transceiver 1012, the user interface 1018, and so on.

One or more processors 1004 of the processing circuit 1002 may be multifunctional, whereby some of the software modules 1016 are loaded and configured to perform different functions or different instances of the same function. The one or more processors 1004 may additionally be adapted to manage background tasks initiated in response to inputs from the user interface 1018, the transceiver 1012, and device drivers, for example. To support the performance of multiple functions, the one or more processors 1004 may be configured to provide a multitasking environment, whereby each of a plurality of functions is implemented as a set of tasks serviced by the one or more processors 1004 as needed or desired. In one example, the multitasking environment may be implemented using a timesharing program 1020 that passes control of a processor 1004 between different tasks, whereby each task returns control of the one or more processors 1004 to the timesharing program 1020 upon completion of any outstanding operations and/or in response to an input such as an interrupt. When a task has control of the one or more processors 1004, the processing circuit is effectively specialized for the purposes addressed by the function associated with the controlling task. The timesharing program 1020 may include an operating system, a main loop that transfers control on a round-robin basis, a function that allocates control of the one or more processors 1004 in accordance with a prioritization of the functions, and/or an interrupt driven main loop that responds to external events by providing control of the one or more processors 1004 to a handling function.

Figure 11:
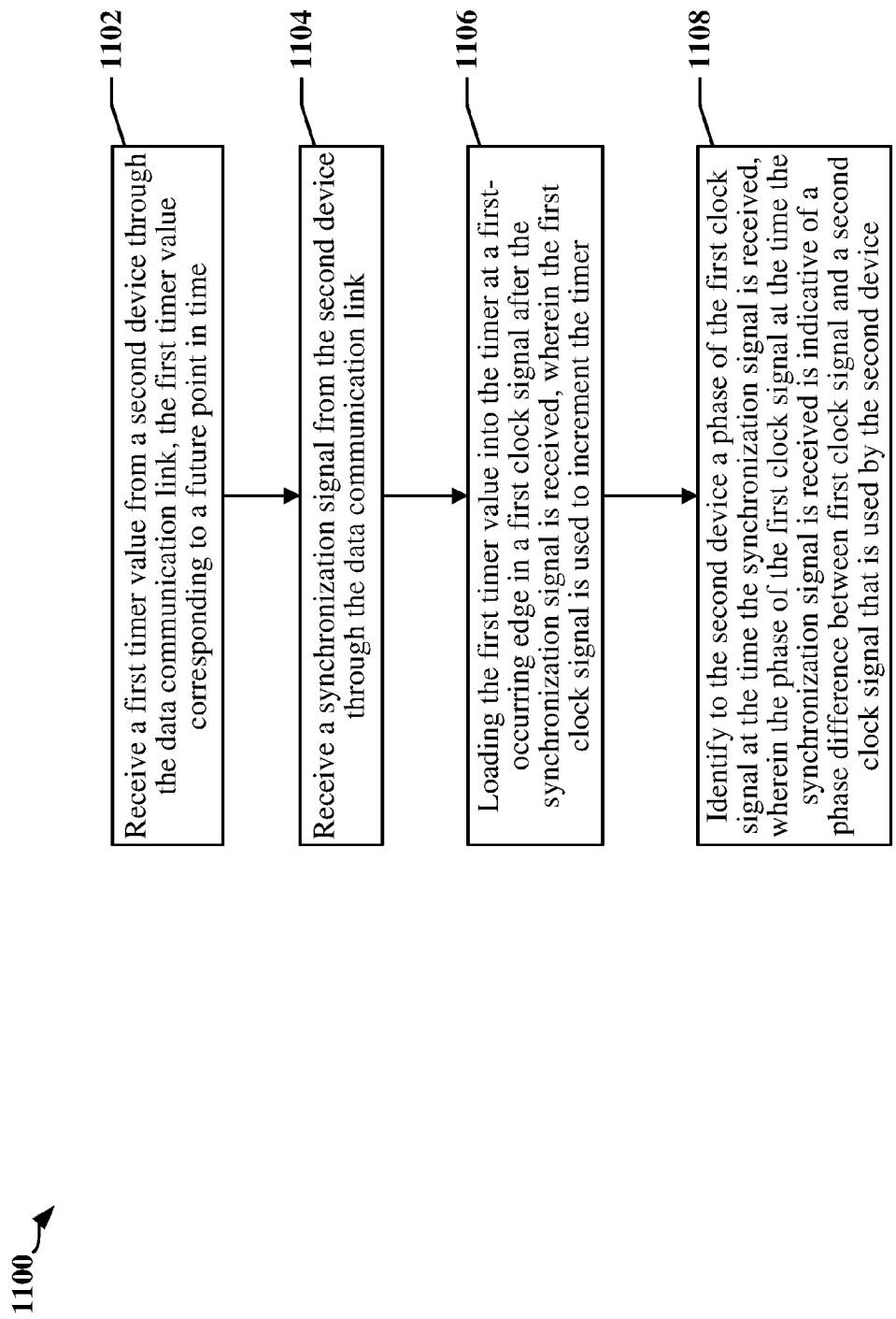
FIG. 11 is a flow chart of a first method related to synchronizing system time used by devices coupled to a data communication link in accordance with certain aspects disclosed herein.

FIG. 11 is a flow chart 1100 of a method for synchronizing timing in devices coupled to a data communication link. The method may be performed at a first device coupled to the data communication link. The first device may use the method to synchronize system time across multiple devices in an apparatus. In one example, the first device may use the method to concurrently synchronize system time on two or more devices.

At block 1102, the first device may receive a first time value from a second device through the data communication link. The first time value may correspond to a future point in time. In one example, the future point in time may occur when a system timer in the second device outputs the first time value.

At block 1104, the first device may receive a trigger signal from the second device through the data communication link. In one example, the trigger signal is received before occurrence or arrival of the future point in time. In some instances, the first device may receive the trigger signal comprises using a metastability-hardened flip-flop to receive the trigger signal from the data communication link.

At block 1106, the first device may load first time value into the timer at a first-occurring edge in a first clock signal after the trigger signal is received. The first clock signal may be used to increment the timer. In one example, the first time value may be loaded into the timer in a cycle of the first clock signal that terminates at the first-occurring edge in the first clock signal.

At block 1108, the first device may identify, to the second device, a phase of the first clock signal at the time the trigger signal is received. The phase of the first clock signal at the time the trigger signal is received is indicative of a phase difference between first clock signal and a second clock signal that is used by the second device. The second clock signal may be used by the second device to increment a system timer on the second device, and where the system timer defines system time for the devices coupled to the data communication link. In one example, the second clock signal is used by the second device to define system time, and the second clock signal may be half the frequency of the first clock signal. In some examples, the phase of the first clock signal at the time the trigger signal is received indicates a difference between system time and a local time maintained by the first timer.

In some instances, a third clock signal may be used to oversample the trigger signal. The first device may sample the trigger signal using the third clock signal, which may have a frequency that is more than twice the frequency of the first clock signal. The first device may count periods of a third clock signal for the duration of each cycle of the first clock. In some examples, the third clock signal may have a frequency that is approximately ten times the frequency of the first clock signal. In certain examples, the third clock signal may have a frequency that more than ten times the frequency of the first clock signal. In some implementations, the first device may identify the phase of the first clock signal at the time the trigger signal is received by providing the second device with a number representing the periods of the third clock signal counted from beginning of a clock cycle of the first clock signal until the trigger signal is received.

In some implementations, the first device may enter a low-power mode of operation after receiving the first time value, and the first device may receive the trigger signal while exiting the low-power mode of operation. The data communication link may be inactive during the low-power mode of operation.

Figure 12:
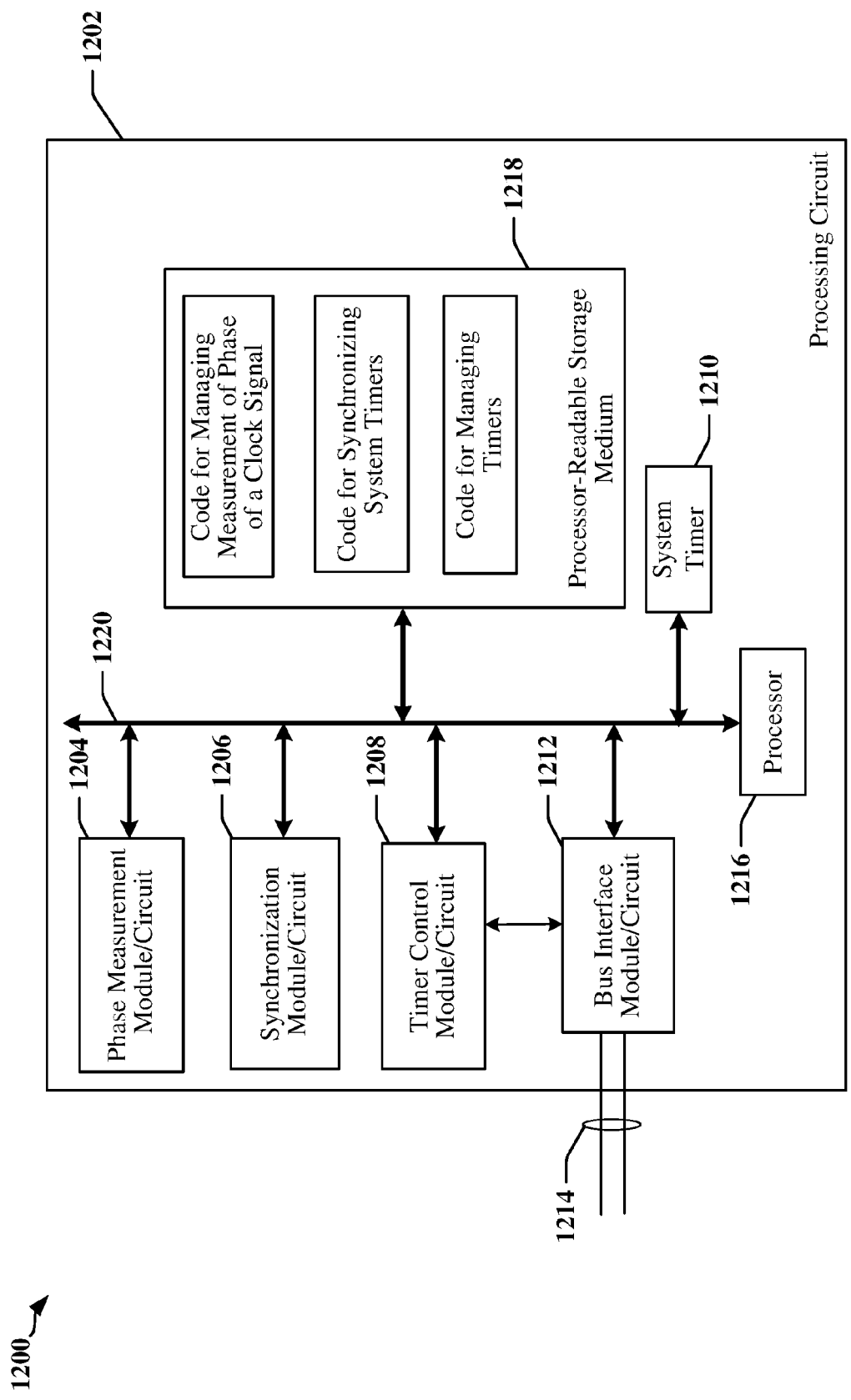
FIG. 12 is a diagram illustrating an example of a hardware implementation for a transmitting apparatus and employing a processing circuit adapted according to certain aspects disclosed herein.

FIG. 12 is a diagram illustrating a simplified example of a hardware implementation for an apparatus 1200 employing a processing circuit 1202. The processing circuit typically has a processor 1216 that may include one or more of a microprocessor, microcontroller, digital signal processor, a sequencer and a state machine. The processing circuit 1202 may be implemented with a bus architecture, represented generally by the bus 1220. The bus 1220 may include any number of interconnecting buses and bridges depending on the specific application of the processing circuit 1202 and the overall design constraints. The bus 1220 links together various circuits including one or more processors and/or hardware modules, represented by the processor 1216, the modules or circuits 1204, 1206, 1208, line interface circuits 1212 configurable to support communication over connectors or wires of a data communication link 1214 and the computer-readable storage medium 1218. The bus 1220 may also link various other circuits such as timing sources, peripherals, voltage regulators, and power management circuits, which are well known in the art, and therefore, will not be described any further.

The processor 1216 is responsible for general processing, including the execution of software stored on the computer-readable storage medium 1218. The software, when executed by the processor 1216, causes the processing circuit 1202 to perform the various functions described supra for any particular apparatus. The computer-readable storage medium may also be used for storing data that is manipulated by the processor 1216 when executing software, including data decoded from symbols transmitted over the data communication link 1214, which may be configured to include data lanes and clock lanes. The processing circuit 1202 further includes at least one of the modules 1204, 1206, 1208, and 1210. The modules 1204, 1206, and 1208 may be software modules running in the processor 1216, resident/stored in the computer-readable storage medium 1218, one or more hardware modules coupled to the processor 1216, or some combination thereof. The modules 1204, 1206, and/or 1208 may include microcontroller instructions, state machine configuration parameters, or some combination thereof.

In one configuration, the apparatus 1200 includes a module and/or circuit 1208 that is configured to manage and operate a system timer 1210, a module and/or circuit 1206 configured to synchronize the system timer 1210 using a time value and trigger signal received from a different apparatus or device through the data communication link 1214, and a module and/or circuit 1204 configured to determine phase of a clock signal at the time of arrival of the trigger signal.

Figure 13:
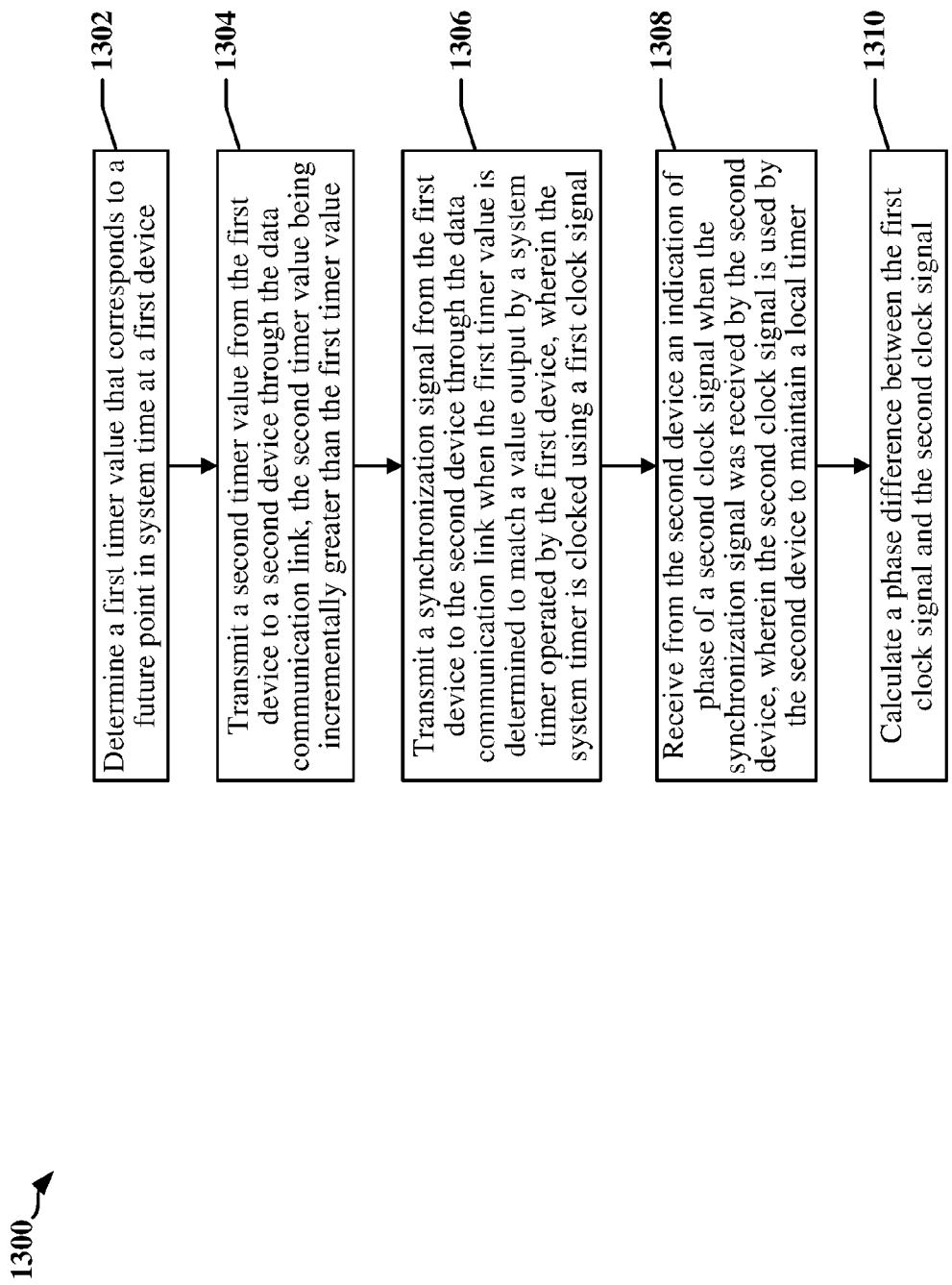
FIG. 13 is a flow chart of a second method related to synchronizing system time used by devices coupled to a data communication link in accordance with certain aspects disclosed herein.

FIG. 13 is a flow chart 1300 of a method for synchronizing system time used by devices coupled to a data communication link. The method may be performed at a first device coupled to the data communication link.

At block 1302, the first device may determine a first time value that corresponds to a future point in system time at a first device.

At block 1304, the first device may transmit a second time value from the first device to a second device through the data communication link. The second time value may be incrementally greater than the first time value.

At block 1306, the first device may transmit a trigger signal from the first device to the second device through the data communication link when the first time value is determined to match a value output by a system timer operated by the first device. The system timer may be clocked using a first clock signal.

At block 1308, the first device may receive from the second device an indication of phase of a second clock signal when the trigger signal was received by the second device. The first clock signal may have a lower frequency than the second clock signal. The second clock signal may be used by the second device to maintain a local timer. The indication of phase may be expressed as a number of periods of a third clock signal that is used by the second device. The third clock signal may have a frequency that is a multiple of the frequency of the first clock signal. The phase of the second clock signal at the time the trigger signal was received by the second device may indicate a difference between system time maintained by the system timer and local time maintained by the local timer.

At block 1310, the first device may calculate a phase difference between the first clock signal and the second clock signal.

In some examples, the first device may enter a low-power mode of operation after transmitting the second time value to the second device, and transmit the trigger signal to the second device while exiting the low-power mode of operation. The data communication link may be inactive during the low-power mode of operation.

In one example, the first device comprises a modem and the second device comprises a radio frequency integrated circuit.

Figure 14:
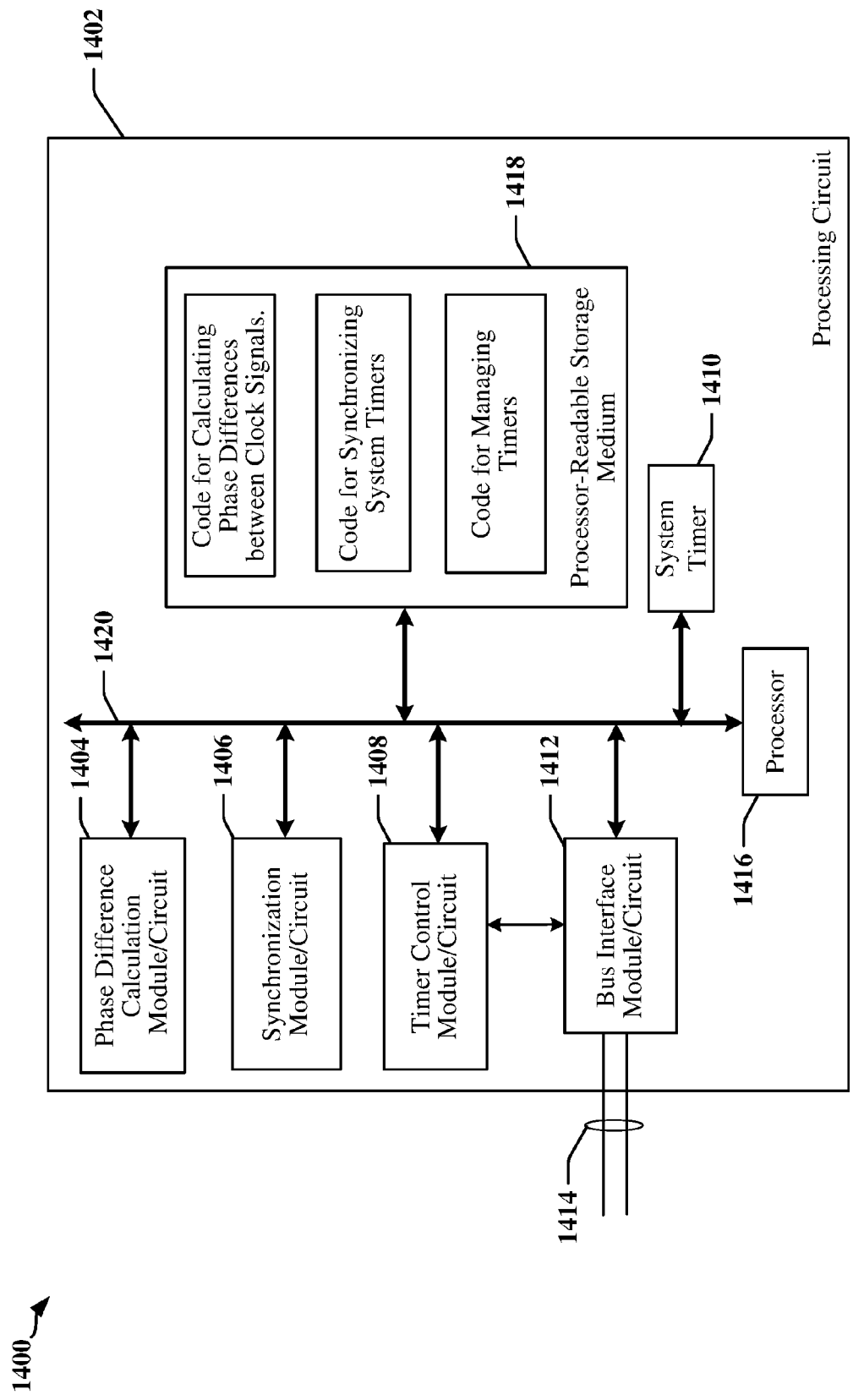
FIG. 14 is a diagram illustrating an example of a hardware implementation for a receiving apparatus and employing a processing circuit adapted according to certain aspects disclosed herein.

FIG. 14 is a diagram illustrating an example of a hardware implementation for an apparatus 1400 employing a processing circuit 1402. The processing circuit typically has a processor 1416 that may include one or more of a microprocessor, microcontroller, digital signal processor, a sequencer and a state machine. The processing circuit 1402 may be implemented with a bus architecture, represented generally by the bus 1420. The bus 1420 may include any number of interconnecting buses and bridges depending on the specific application of the processing circuit 1402 and the overall design constraints. The bus 1420 links together various circuits including one or more processors and/or hardware modules, represented by the processor 1416, the modules or circuits 1404, 1406, 1408, line interface circuits 1412 configurable to communicate over connectors or wires of a data communication link 1414 and the computer-readable storage medium 1418. The bus 1420 may also link various other circuits such as timing sources, peripherals, voltage regulators, and power management circuits, which are well known in the art, and therefore, will not be described any further.

The processor 1416 is responsible for general processing, including the execution of software stored on the computer-readable storage medium 1418. The software, when executed by the processor 1416, causes the processing circuit 1402 to perform the various functions described supra for any particular apparatus. The computer-readable storage medium may also be used for storing data that is manipulated by the processor 1416 when executing software, including data decoded from symbols transmitted over the data communication link 1414, which may be configured to include data lanes and clock lanes. The processing circuit 1402 further includes at least one of the modules 1404, 1406, and 1408. The modules 1404, 1406, and 1408 may be software modules running in the processor 1416, resident/stored in the computer-readable storage medium 1418, one or more hardware modules coupled to the processor 1416, or some combination thereof. The modules 1404, 1406, and/or 1408 may include microcontroller instructions, state machine configuration parameters, or some combination thereof.

In one configuration, the apparatus 1400 includes a module and/or circuit 1408 that is configured to manage and operate a local system timer 1410, a module and/or circuit 1406 configured to synchronize a system timer in a different apparatus by transmitting a time value and trigger signal over the data communication link 1414, and a module and/or circuit 1404 configured to calculate a phase difference between a clock signal of the apparatus 1400 and a corresponding clock signal in the different apparatus.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for synchronizing timing in devices coupled to a data communication link, comprising:
at a first device, receiving a first time value from a second device through the data communication link, the first time value corresponding to a future point in time;
at the first device, receiving a trigger signal from the second device through the data communication link;
loading the first time value into a timer of the first device, at a first-occurring edge in a first clock signal after the trigger signal is received, wherein the first clock signal is used to increment the timer; and
identifying to the second device a phase of the first clock signal at the time the trigger signal is received,
wherein the phase of the first clock signal at the time the trigger signal is received is indicative of a phase difference between first clock signal and a second clock signal that is used by the second device.

2. The method of claim 1, wherein the first time value is loaded into the timer in a cycle of the first clock signal that terminates at the first-occurring edge in the first clock signal.

3. The method of claim 1, further comprising:
sampling the trigger signal using a third clock signal that has a frequency that is more than twice the frequency of the first clock signal.

4. The method of claim 1, further comprising:
counting periods of an oversampling clock signal for the duration of each cycle of the first clock signal, wherein the oversampling clock signal has a frequency that is greater than the frequency of the first clock signal; and
identifying the phase of the first clock signal at the time the trigger signal is received by providing the second device with a number representing the periods of the oversampling clock signal counted from beginning of a clock cycle of the first clock signal until the trigger signal is received.

5. The method of claim 1, wherein the trigger signal is received before arrival of the future point in time.

6. The method of claim 1, comprising:
entering a low-power mode of operation after receiving the first time value; and
receiving the trigger signal while exiting the low-power mode of operation,
wherein the data communication link is inactive during the low-power mode of operation.

7. The method of claim 1, wherein the second clock signal is used by the second device to increment a system timer on the second device, and wherein the system timer defines system time for the devices coupled to the data communication link.

8. The method of claim 1, wherein the second clock signal is used by the second device to define system time, and wherein the second clock signal is half the frequency of the first clock signal.

9. The method of claim 8, wherein the phase of the first clock signal at the time the trigger signal is received indicates a difference between system time and a local time maintained by the timer.

10. The method of claim 1, wherein receiving the trigger signal comprises:
using a metastability-hardened flip-flop to receive the trigger signal from the data communication link.

11. An apparatus, comprising:
a data communication link;
a first device coupled to the data communication link and adapted to define system time; and
a second device coupled to the data communication link and having a timer adapted to track the system time, wherein the second device is configured to:
receive a first time value from the first device through the data communication link, the first time value corresponding to a future point in time;
receive a trigger signal from the first device through the data communication link;
load the first time value into the timer, at a first-occurring edge in a first clock signal after the trigger signal is received, wherein the first clock signal is used to increment the timer; and
identify to the first device a phase of the first clock signal at the time the trigger signal is received,
wherein the phase of the first clock signal at the time the trigger signal is received is indicative of a phase difference between first clock signal and a second clock signal that is used by the first device.

12. The apparatus of claim 11, wherein the first time value is loaded into the timer in a cycle of the first clock signal that terminates at the first-occurring edge in the first clock signal.

13. The apparatus of claim 11, further comprising:
a counter adapted to count of an oversampling clock for the duration of each cycle of the first clock signal, wherein the oversampling clock has a frequency that is greater than the frequency of the first clock signal, and wherein the second device is configured to:
identify the phase of the first clock signal at the time the trigger signal is received by providing the first device with a number representing a number of periods of the oversampling clock counted from beginning of a clock cycle of the first clock signal until the trigger signal is received.

14. The apparatus of claim 11, wherein the trigger signal is received before arrival of the future point in time.

15. The apparatus of claim 11, wherein the trigger signal is received while the second device is exiting a low-power mode of operation when the data communication link is inactive.

16. The apparatus of claim 11, wherein the first device comprises a system timer incremented by the second clock signal.

17. The apparatus of claim 11, wherein the second clock signal has a frequency that is half the frequency of the first clock signal.

18. The apparatus of claim 17, wherein the phase of the first clock signal at the time the trigger signal is received indicates a difference between system time and a local time maintained by the timer of the second device.

19. The apparatus of claim 11, wherein the second device comprises a metastability-hardened flip-flop configured to receive the trigger signal from the data communication link.

20. A method for synchronizing system time used by devices coupled to a data communication link, comprising:
determining a first time value that corresponds to a future point in system time at a first device;

transmitting a second time value from the first device to a second device through the data communication link, the second time value being incrementally greater than the first time value;

transmitting a trigger signal from the first device to the second device through the data communication link when the first time value is determined to match a value output by a system timer operated by the first device, wherein the system timer is clocked using a first clock signal;

receiving from the second device an indication of phase of a second clock signal when the trigger signal was received by the second device, wherein the second clock signal is used by the second device to maintain a local timer; and calculating a phase difference between the first clock signal and the second clock signal using the indication of the phase of the second clock signal when the trigger signal was received by the second device.

21. The method of claim 20, wherein the indication of phase is expressed as a number of periods of a third clock signal that is used by the second device, wherein the third clock signal has a frequency that is a multiple of the frequency of the first clock signal.

22. The method of claim 20, comprising:
entering a low-power mode of operation after transmitting the second time value to the second device; and
transmitting the trigger signal to the second device while exiting the low-power mode of operation,
wherein the data communication link is inactive during the low-power mode of operation.

23. The method of claim 20, wherein the first clock signal has a lower frequency than the second clock signal.

24. The method of claim 23, wherein the phase of the second clock signal at the time the trigger signal was received by the second device indicates a difference between system time maintained by the system timer and local time maintained by the local timer.

25. The method of claim 20, wherein the first device comprises a modem and the second device comprises a radio frequency integrated circuit.

26. An apparatus, comprising:
means for determining a first time value that corresponds to a future point in system time at a first device coupled to a data communication link;

means for transmitting a second time value from the first device to a second device through the data communication link, the second time value being incrementally greater than the first time value;

means for transmitting a trigger signal from the first device to the second device through the data communication link when the first time value is determined to match a value output by a system timer operated by the first device, wherein the system timer is clocked using a first clock signal;

means for receiving from the second device an indication of phase of a second clock signal when the trigger signal was received by the second device, wherein the second clock signal is used by the second device to maintain a local timer; and means for calculating a phase difference between the first clock signal and the second clock signal using the indication of the phase of the second clock signal when the trigger signal was received by the second device.

27. The apparatus of claim 26, wherein the indication of phase is expressed as a number of periods of a third clock signal that is used by the second device, wherein the third clock signal has a frequency that is a multiple of the frequency of the first clock signal.

28. The apparatus of claim 26, wherein the means for transmitting the trigger signal is configured to:
transmit the trigger signal to the second device while the data communication link is exiting a low-power mode of operation,
wherein the data communication link enters the low-power mode of operation after the second time value is transmitted to the second device.

29. The apparatus of claim 26, wherein the first clock signal has a lower frequency than the second clock signal.

30. The apparatus of claim 29, wherein the phase of the second clock signal at the time the trigger signal was received by the second device indicates a difference between system time maintained by the system timer and local time maintained by the local timer.

* * * * *